US006973045B2

(12) United States Patent
Iwasaki et al.

(10) Patent No.: US 6,973,045 B2
(45) Date of Patent: Dec. 6, 2005

(54) TRANSMISSION SYSTEMS, SUPERVISORY CONTROL DEVICE, METHOD OF OUTPUTTING DATA IN THE SUPERVISORY CONTROL DEVICE, AND NODES FOR TRANSMITTING DATA IN THE TRANSMISSION SYSTEM

(75) Inventors: Hidetoshi Iwasaki, Kawasaki (JP); Harumi Yamada, Hachioji (JP); Hideo Yamagiwa, Sagamihara (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 867 days.

(21) Appl. No.: 09/788,592

(22) Filed: Feb. 21, 2001

(65) Prior Publication Data

US 2001/0015961 A1 Aug. 23, 2001

(30) Foreign Application Priority Data

Feb. 21, 2000 (JP) ............................. 2000-043206

(51) Int. Cl.$^7$ ........................................... H04L 12/26
(52) U.S. Cl. ..................................... 370/252; 370/248
(58) Field of Search ............................... 370/223, 224, 370/241, 248, 249, 250, 252

(56) References Cited

U.S. PATENT DOCUMENTS

| 5,781,703 A | * | 7/1998 | Desai et al. .................... 706/50 |
| 5,864,608 A | * | 1/1999 | Brownmiller et al. . 379/112.06 |
| 6,069,875 A | * | 5/2000 | Miller et al. ................ 370/244 |
| 6,678,250 B1 | * | 1/2004 | Grabelsky et al. .......... 370/241 |
| 6,765,864 B1 | * | 7/2004 | Natarajan et al. ........... 370/224 |
| 6,785,285 B1 | * | 8/2004 | Romana et al. ......... 370/395.51 |

OTHER PUBLICATIONS

C. Darodes, Commutation & Transmission, vol. 16, No. 4, pp. 35-44, "Le Système Regina Pour La Collecte, la Gestion et la Diffusion D'alarmes", 1994.
Y. Kiriha, et al., NEC Research & Development, vol. 33, No. 1, "Fault Analysis Expert System for Unifield Network Management: Exnets", Jan., 1992.
H. Tarle, Ericson Review, vol. 67, No. 4, pp. 163-182, "FMAS—An Operations Support System for Transport Networks", 1990.
H. Seshake, et al., IEEE Network Operations and Management Symposium (NOMS), vol. SYM. 5, pp. 349-359, "Data Communication Platform in Distributed Operations System Based on TMN", Apr. 15, 1996.

* cited by examiner

Primary Examiner—Ricky Ngo
Assistant Examiner—Christine Ng
(74) Attorney, Agent, or Firm—Oblon, Spivak, McClelland, Maier & Neustadt, P.C.

(57) ABSTRACT

When the operator requests the output of performance data, if all the pieces of performance data in the requested time range could not be acquired, the output control section of each of supervisory control devices M1 to Mn will determine the cause. When the cause that all the pieces of performance data could not be acquired is the execution of zero suppression at nodes N1 to Nn, the data items related to the pieces of performance data that could not be acquired are made zero and the resulting data is outputted.

13 Claims, 21 Drawing Sheets

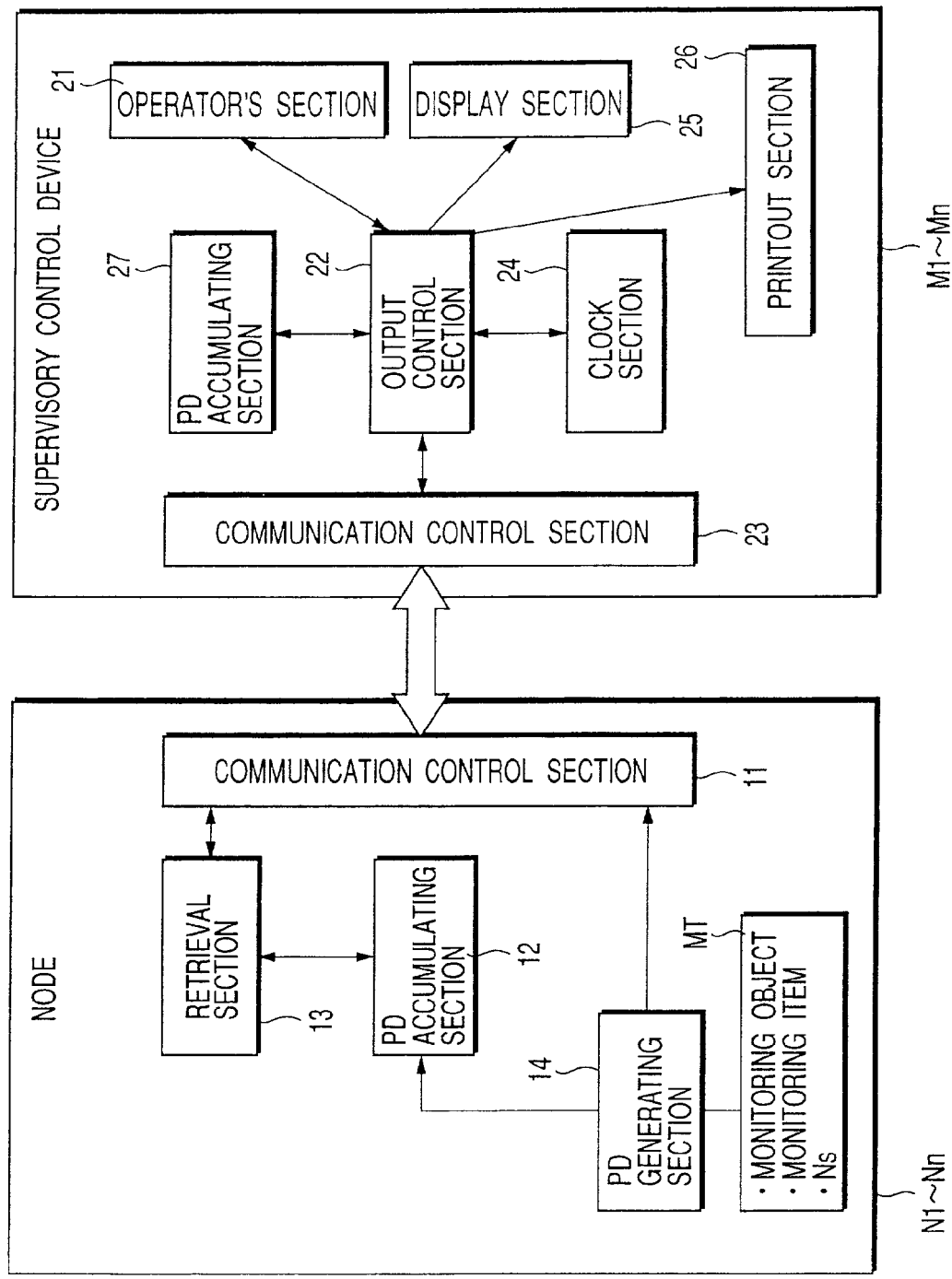
F I G. 8

FIG.15

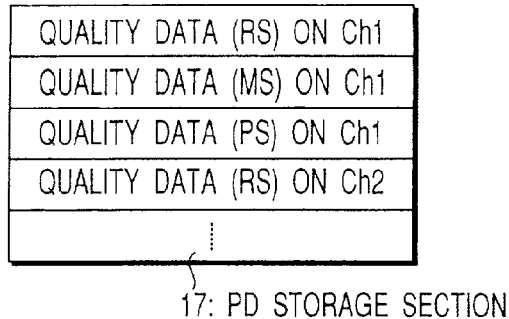

17: PD STORAGE SECTION

FIG.16

| | BIT7 | | BIT3 | | BIT0 |
|---|---|---|---|---|---|
| | COMPRESSION INFORMATION (0: ABSENT/F: PRESENT) | | | | |
| INFORMATION ON Ch 1 | APS CREATE (0: ABSENT/ 1: PRESENT) | INSTALLATION (0: ABSENT/ 1: PRESENT) | VALUE 1: STM-1 2: STM-4 4: STM-16 8: STM-64 TYPE OF CIRCUIT BOARD | | |
| INFORMATION ON Ch 2 | | | | | |
| ⋮ | | | | | |

18: CHANNEL INFORMATION STORAGE SECTION

FIG.17

| | BIT7 | | BIT3 | BIT0 |
|---|---|---|---|---|
| INFORMATION ON SHELF 1 | COMPRESSION INFORMATION (0: ABSENT/ 1: PRESENT) | ABSENCE OR PRESENCE OF SHELF (0: ABSENT/ 1: PRESENT) | VALUE 1: STM-1 2: STM-4 4: STM-16 8: STM-64 TYPE OF CIRCUIT BOARD | |
| ⋮ | | | | |

114: CONFIGURATION INFORMATION STORAGE SECTION

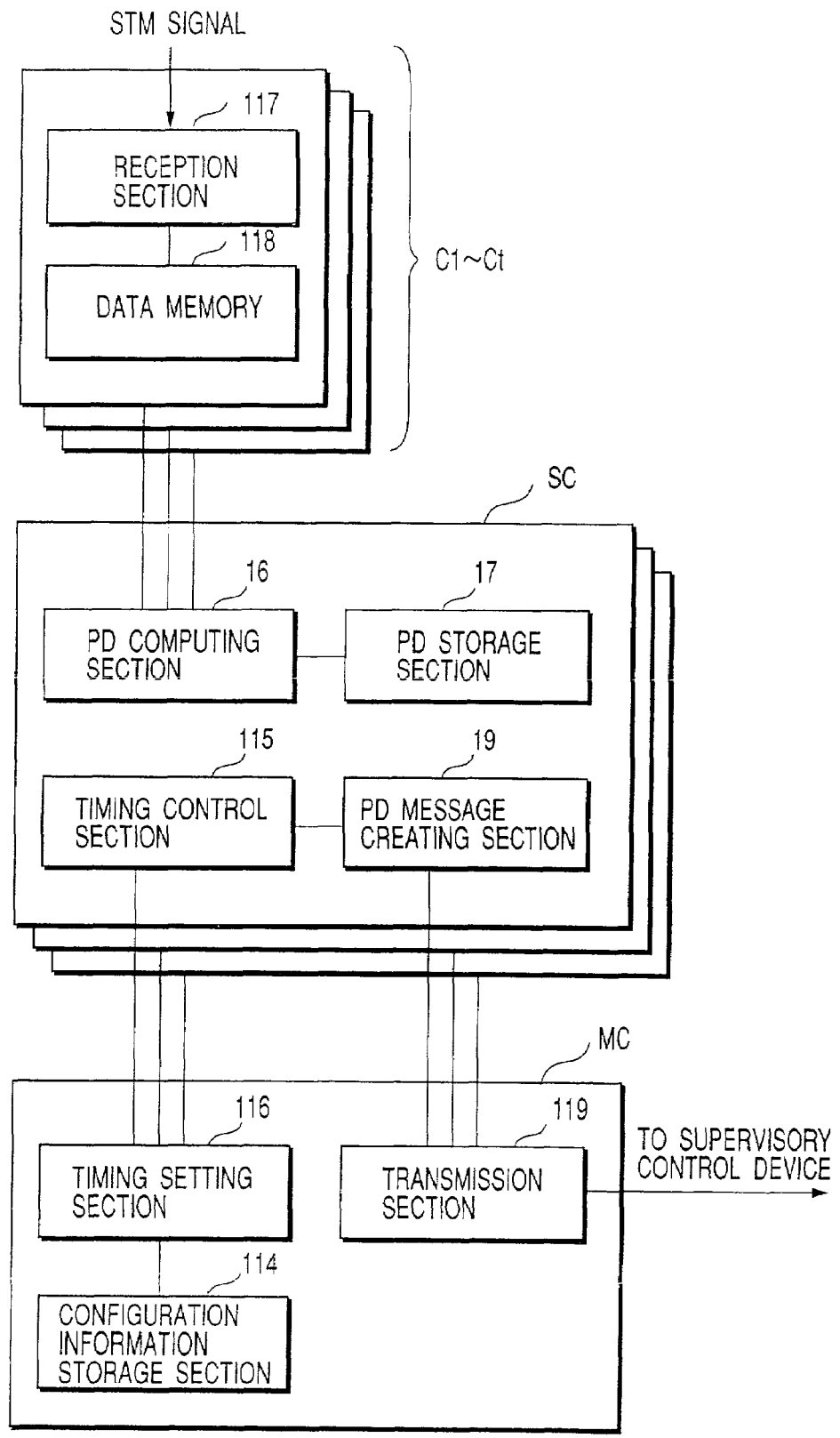
F I G. 20

TRANSMISSION SYSTEMS, SUPERVISORY CONTROL DEVICE, METHOD OF OUTPUTTING DATA IN THE SUPERVISORY CONTROL DEVICE, AND NODES FOR TRANSMITTING DATA IN THE TRANSMISSION SYSTEM

CROSS-REFERENCE TO RELATED APPLICATIONS

This application is based upon and claims the benefit of priority from the prior Japanese Patent Application No. 2000-043206, filed Feb. 21, 2000, the entire contents of which are incorporated herein by reference.

BACKGROUND OF THE INVENTION

Generally, a transmission system comprises nodes for transmitting communication data and supervisory control devices for maintaining and operating a communication network. The supervisory control devices maintain or operate the communication network on the basis of the management information received from the individual nodes.

The management object definition, network management procedure, and others have been recommended in ISO (International Organization for Standardization) or ITU (International Telecommunication Union).

One piece of management information is performance data created at each node. Each node periodically monitors the value of data representing the time during which errors exceeded the allowed value for each monitoring item, such as the bit error rate of transmission data, or the number of errors occurred, and creates performance data on the basis of the result of the monitoring.

This type of system may use the zero suppression function determined in ITU-T recommendation Q. 822. The zero suppression function is the function of reducing the amount of the performance data created. Use of this function makes it possible to reduce the burden of creating performance data on the nodes, the burden of processing the performance data on the supervisory control devices, and the communication burden of informing the performance data on the network.

At a node, data about each monitoring item is monitored at specific intervals of time, for example, at intervals of 15 minutes. On the basis of the result of the monitoring, performance data is created. It is assumed that in a monitoring period, data items about all the monitoring items take a value of 0. In this case, at a node with the zero suppression function, no performance data will be created in that monitoring period. Instead, the number of times performance data was not created is counted up.

For example, when the data items monitored at intervals of 15 minutes take a value of 0 consecutively, the zero suppression function produces no performance data in that period for up to 8 hours (that is, equivalent to consecutive 32 times of monitoring).

Such a process suppresses the number of pieces of performance data, reducing the number of times a node informs the supervisory control device of performance data, which alleviates the burden particularly on the network.

In a system using this type of function, however, when the performance data does not reach the supervisory control device, there is no way for the supervisory control device to find its cause. That is, the supervisory control device expects to receive performance data from the node at specific intervals. However, when it receives no performance data at the time when it is supposed to receive performance data, the supervisory control device cannot judges whether the absence of performance data contributes to the zero suppression function or the occurrence of a failure.

For this reason, when reading the data on the screen display or from the printout, the user (or the operator of the supervisory control device) encounters the disadvantage that the part where no performance data has arrived cannot help being left blank. Such a disadvantage must be eliminated, because the user not only cannot get the necessary information but also might misunderstand the occurrence of a failure.

BRIEF SUMMARY OF THE INVENTION

An first object of the present invention is to provide a transmission system which has a zero suppression function and is capable of offering information the user needs as much as possible to achieve an improved human-machine interface (HMI), a supervisory control device, and a method of outputting the data in the supervisory control device.

A second object of the present invention is to provide a node which alleviates the burden of communication related to notice of performance data.

The foregoing objects are accomplished by providing a transmission system comprising a plurality of nodes forming a network and a supervisory control device for managing the network on the basis of performance data created at these nodes, wherein each of the plurality of nodes includes performance data generating means for measuring individual data items about the monitoring items defined for a plurality of objects to be measured according to a specific schedule and, on the basis of the result of the measurement, creating the performance data using a zero suppression function of suppressing a succession of zero data items, and performance data sending means for sending the performance data created at the performance data generating means to the supervisory control device, and the supervisory control device includes reception means for receiving the performance data send from the nodes, storage means for accumulating a history of the received performance data, user interface means for accepting the user's data output request with specified retrieval conditions including a time range and outputting the data fulfilling the request, and output control means which determines the cause that the performance data is absent, when the performance data that should be present in the storage means according to the schedule is absent in the time range specified in the retrieval conditions in acquiring the performance data fulfilling the retrieval conditions from the storage means, and if the cause is the execution of zero suppression at the performance data generating means, makes the data item related to the absent performance data zero, and which then creates data for output at the user interface means on the basis of the acquired performance data and causes the user interface means to output the created data.

With this configuration, when all the pieces of performance data requested cannot be acquired from the storage means in the process of outputting the performance data from the user interface means, the cause is determined. If the cause that there is a piece of performance data that could not be acquired is the execution of zero suppression at the performance data generating means, the data item related to the performance data that could not be acquired will be made zero and then output data be created. The output data will be outputted in the form of screen display or printout.

Consequently, even if there is a possibility that a blank space will occur in the outputted information, the cause will be determined correctly. Particularly when no performance data is created because of zero suppression, the supervisory control device inserts 0s in the data related to the absent performance data.

Therefore, it is possible to avoid the occurrence of a blank space in the output stage as much as possible, which helps eliminate a misunderstanding or unnecessary worry on the user part. That is, the information the user needs can be offered to the maximum, which improves the human-machine interface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a functional block diagram showing the configuration of a second embodiment of the transmission system shown in FIG. 1;

FIG. 15 shows how the data is stored in the PD storage section 17 shown in FIG. 14;

FIG. 16 shows an example of the data stored in the channel information storage section 18 shown in FIG. 14;

FIG. 17 shows an example of the data stored in the configuration information storage section 114 shown in FIG. 14;

FIG. 20 is a functional block diagram showing the configuration of nodes N1 to Nn of FIG. 1 in a transmission system according to a third embodiment of the present invention in FIG. 1.

DETAILED DESCRIPTION OF THE INVENTION

Hereinafter, referring to the accompanying drawings, embodiments of a transmission system according to the present invention will be explained in detail. In the explanation below, a ring network system complying with the SDH standard will be used.

(System Configuration)

Figure 1:
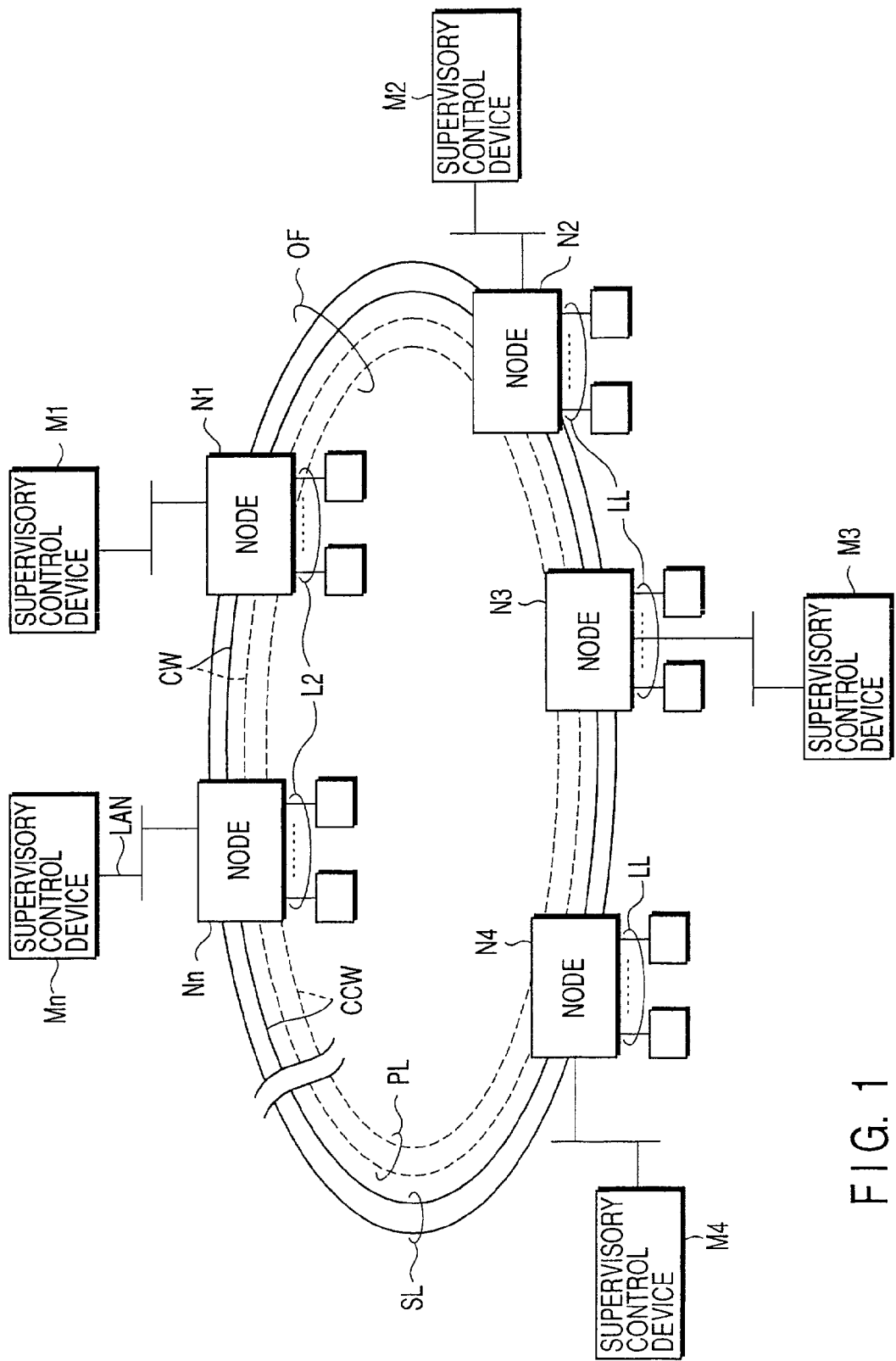
FIG. 1 shows the configuration of a transmission system according to a first embodiment of the present invention.

FIG. 1 shows the configuration of a transmission system related to a first embodiment of the present invention. The system is provided with an n number of nodes N1 to Nn connected in a ring via a line cable OF. The line cable OF has a transmission capacity of STM-64 (Synchronous Transfer Module-Level 64) class in the SDH standard.

The line cable OF includes a live transmission path SL and a backup transmission path PL. Each of the transmission paths SL, PL includes clockwise (CW) and counterclockwise (CCW) circuits.

Nodes N1 to Nn drop specific slots from the time slots time-division multiplexed onto the STM-64 signal transmitted via the line cable OF. The dropped slots are sent as a low-order group signal to low-order group devices (not indicated by reference numerals) on the tributary side, including an exchange and an end office.

Furthermore, nodes N1 to Nn multiplex the low-order group signals, including STM-1, STM-4, STM-16, and STM-64, sent via the tributary transmission path LL from the low-order group devices onto specific time slots of a STM-64 signal. The multiplexed signal is sent to another node. In this way, a transmission path with a specific transmission capacity is set between nodes N1 to Nn.

The system of FIG. 1 is further provided with a plurality of supervisory control devices M1 to Mn. Supervisory control devices M1 to Mn are connected to nodes N1 to Nn via a LAN (Local Area Network). Supervisory control devices M1 to Mn receive information from nodes N1 to Nn respectively, and on the basis of the information, set a communication path in the network or monitor an alarm. Such functions of supervisory control devices M1 to Mn are realized by installing dedicated application programs on, for example, a general-purpose workstation.

The notice information sent from the nodes N1 to Nn is particularly transmitted to the supervisory control devices M1 to Mn via a LAN. A LAN forms a communication network for managing the network, namely a management network. Traffic for transmitting the notice information to the supervisory control devices M1 to Mn mainly takes the route of a LAN. For this reason, it is necessary to prevent a LAN from becoming a bottleneck in exchanging the notice information.

Figure 2:
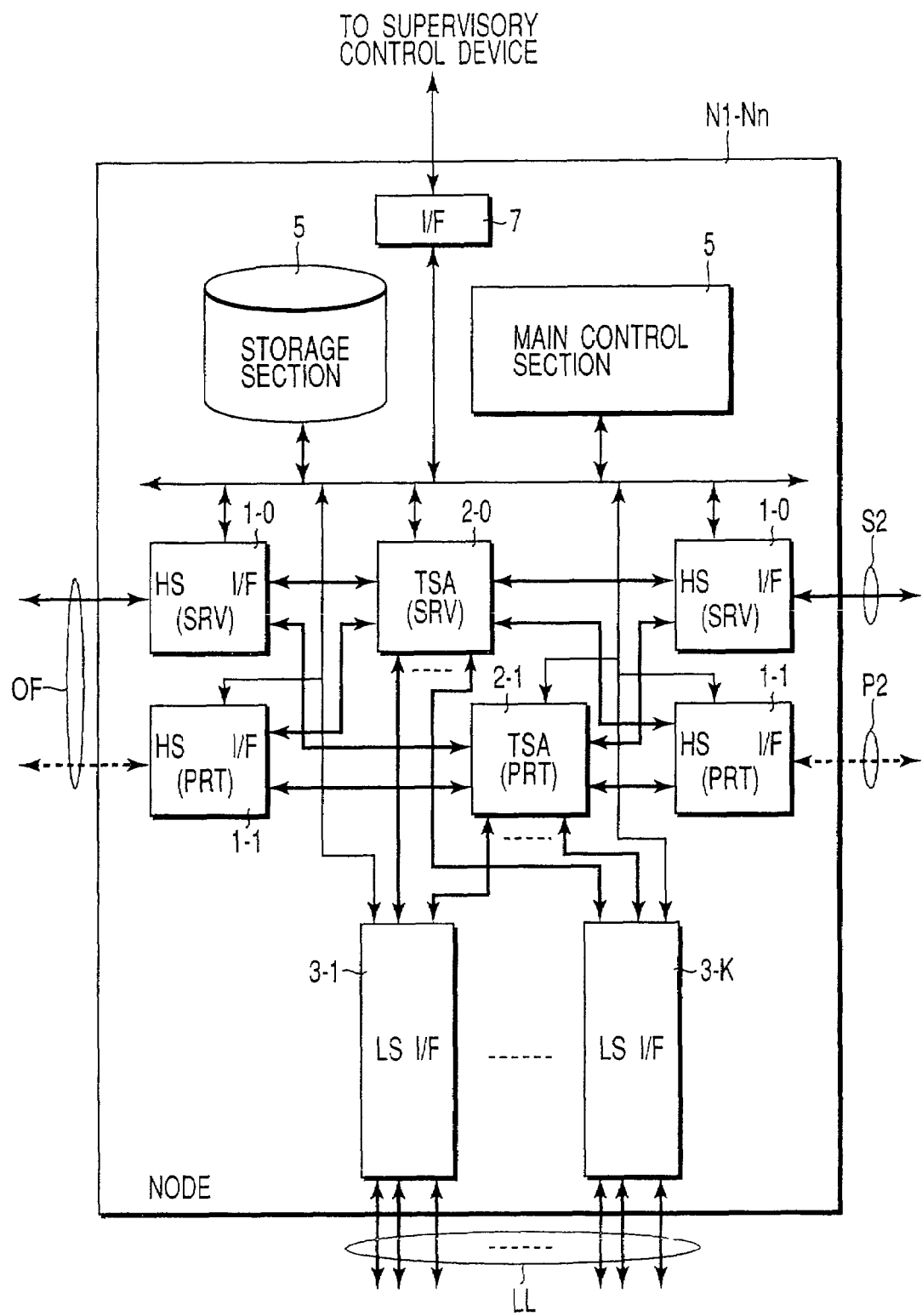
FIG. 2 is a block diagram schematically showing the configuration of nodes N1 to Nn shown in FIG. 1.

FIG. 2 shows the configuration of nodes N1 to Nn related to the first embodiment of the present invention. In FIG. 2, reference numerals 1-0 indicates a live line interface section (HS I/F) to which the live transmission path SL is connected. Reference numeral 1-1 indicates a standby line interface section to which the standby transmission path PL is connected.

An STM-64 signal introduced via the live line interface section 1-0 and standby line interface section 1-1 into the device is supplied to a time slot assignment section (hereinafter, referred to as a TSA) 2-0 and a TSA 2-1. TSA 2-0 and TSA 2-1 drop specific time slots from the time slots time-division multiplexed onto the STM-64 signal. The dropped slots are set as a low-order signal from the tributary transmission path LL via tributary interface (LS I/F) shelves 3-1 to 3-k. Conversely, the low-order group signal introduced into the device via the tributary transmission path LL from the tributary transmission path LL via LS I/F shelves 3-1 to 3-k are supplied to TSA 2-0 and TSA 2-1, which add the signal to specific time slots of the STM-64 frame. The resulting signal is sent to another node via the line cable OF.

Here, TSA 2-0 is used as a live unit in a normal operation of the system. If a failure occurs in TSA 2-0, TSA 2-1 will be operated in place of TSA 2-0. In this way, redundancy in the device is realized.

Each of nodes N1 to Nn in FIG. 2 further includes a main control section 5, a storage section 6 that stores various kinds of control programs, and a management network interface (I/F) 7 that interfaces with supervisory control devices M1 to Mn.

Figure 3:
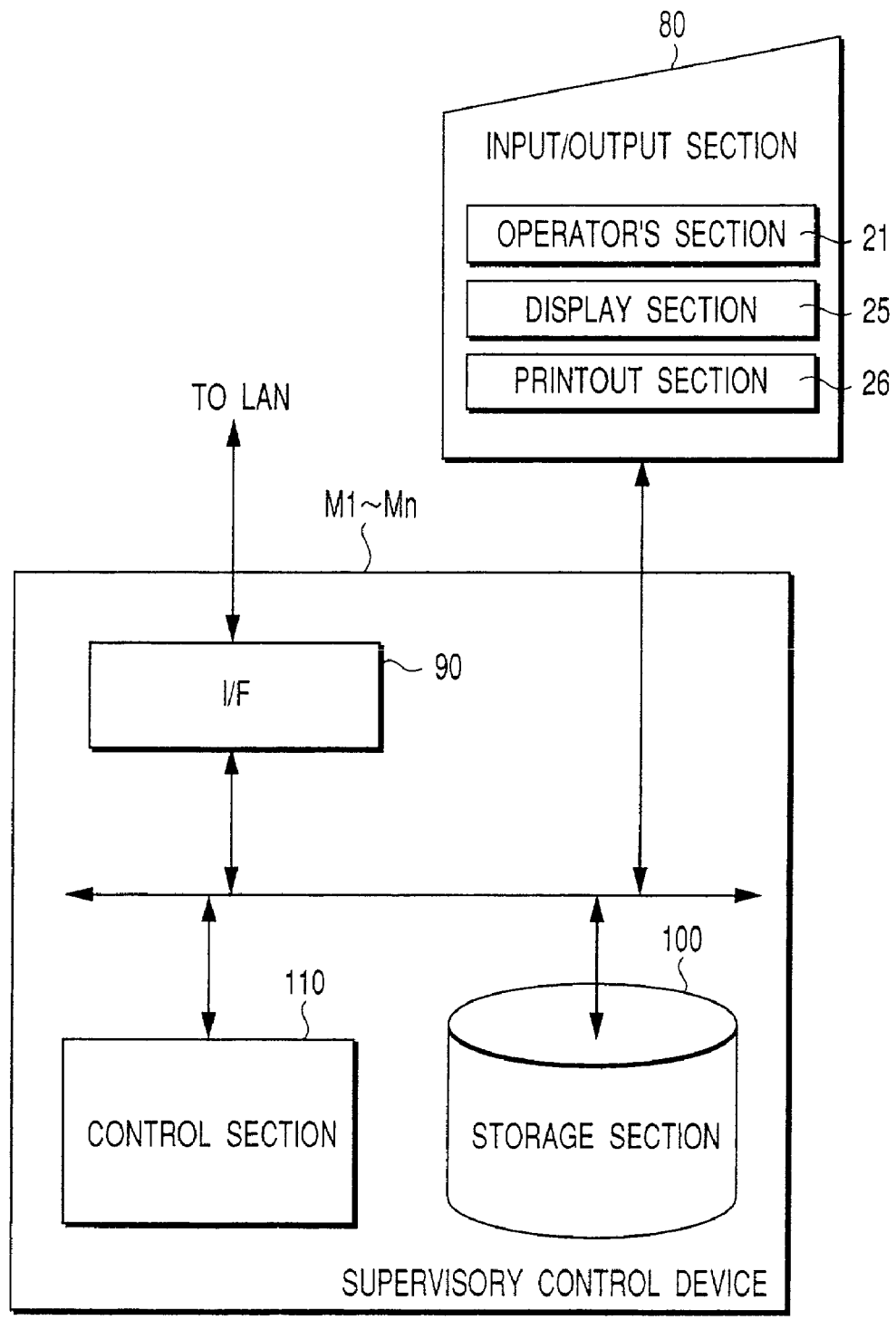
FIG. 3 is a block diagram schematically showing the configuration of supervisory control devices M1 to Mn shown in FIG. 1.

FIG. 3 shows the configuration of each of supervisory control devices M1 to Mn. Supervisory control devices M1 to Mn execute the management of the entire system on the basis of the performance data received from nodes N1 to Nn. Each of supervisory control devices M1 to Mn includes an operator's section 21, a display section 25, an input/output section 80 with a printout section 26, an interface (I/F) section 90 that provides connection interface with the individual nodes N1 to Nn via the LAN, a storage section 100 that stores various kinds of supervisory control programs, and a control section 110.

(First Embodiment)

Figure 4:
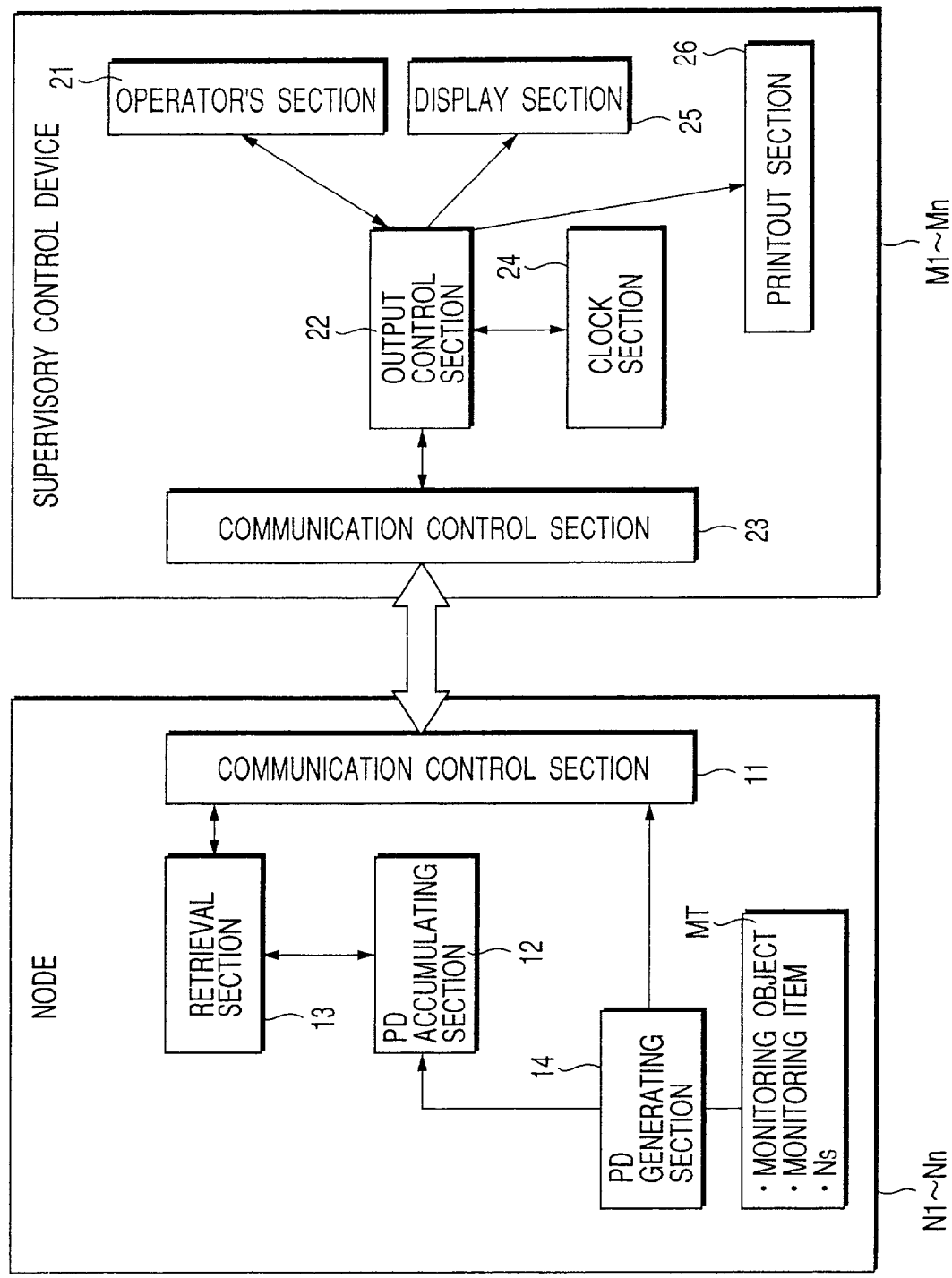
FIG. 4 is a functional block diagram showing the configuration of a first embodiment of the transmission system shown in FIG. 1.

FIG. 4 is a functional block diagram showing the configuration of each of nodes N1 to Nn and each of supervisory control devices M1 to Mn in a first embodiment of the present invention. The basic configuration of nodes N1 to Nn is shown in FIG. 2. As for the part of the configuration related to performance data, the main control section 5 of FIG. 2 comprises a communication control section 11 for information communication with supervisory control devices M1 to Mn, a performance data accumulating section (hereinafter, referred to as a PD accumulating section) 12, a retrieval section 13, and a performance data generating section (hereinafter, referred to as a PD generating section) 14.

Hereinafter, applications of the present invention will be divided into three cases (a first modification to a third modification) explained below.

The PD accumulating section 12 stores performance data created at the PD generating section 14. That is, a history of the performance data is accumulated in the PD accumulating section 12. The retrieval section 13 retrieves the performance data corresponding to the request from supervisory control devices M1 to Mn from the PD accumulating section 12.

The communication control section 11 controls communication for transmitting and receiving the performance data and other information to and from supervisory control devices M1 to Mn. Specifically, the communication control section 11 transmits and receives the information to and from supervisory control devices M1 to Mn via the I/F 7 of FIG. 2.

The PD generating section 14 measures, at specific intervals of time, data items about the individual monitoring items defined for a plurality of objects to be measured in the HS I/F and LS I/F of its own node and generates pieces of performance data on the basis of the results of the measurement. When all the data items about the monitoring items take a value of 0, the PD generating section 14 effects zero suppression and generates no performance data. After a specific period of time (for example, eight hours) has elapsed, even if 0s appear consecutively, the PD generating section 14 cancels the zero suppression temporarily and then creates performance data. Thereafter, it waits for the value of the data to change.

The PD generating section 14 includes a management table MT as shown in the figure. In the management table, monitoring objects, monitoring items, the number Ns of times zero suppression was effected, and others are stored. Monitoring objects are information as to, for example, which section of which channel is to be monitored. Performance events are information representing such items as TCCV or ES explained later. The PD generating section 14 creates performance data on the basis of the contents stored in the management table MT.

The monitoring items include TCCV (Total Count of Code Violation), BBE (Background Block Error), ES (Erroneous Second), SES (Seriously Erroneous Seconds), UAS (Unavailable Seconds), OFS (Out-of-Frame Second), PJC (Pointer Justification Count), PSC (Protection Switch Count), and PSD (Protection Switch Duration).

In FIG. 4, each of supervisory control devices M1 to Mn comprises not only the operator's section 21, display section 25, and printout section 26 but also an output control section 22, a communication control section 23, and a clock section 24.

The communication section 23 controls information communication between its own device and nodes N1 to Nn. The clock section 24 generates an operating clock in its own device.

Figure 5:
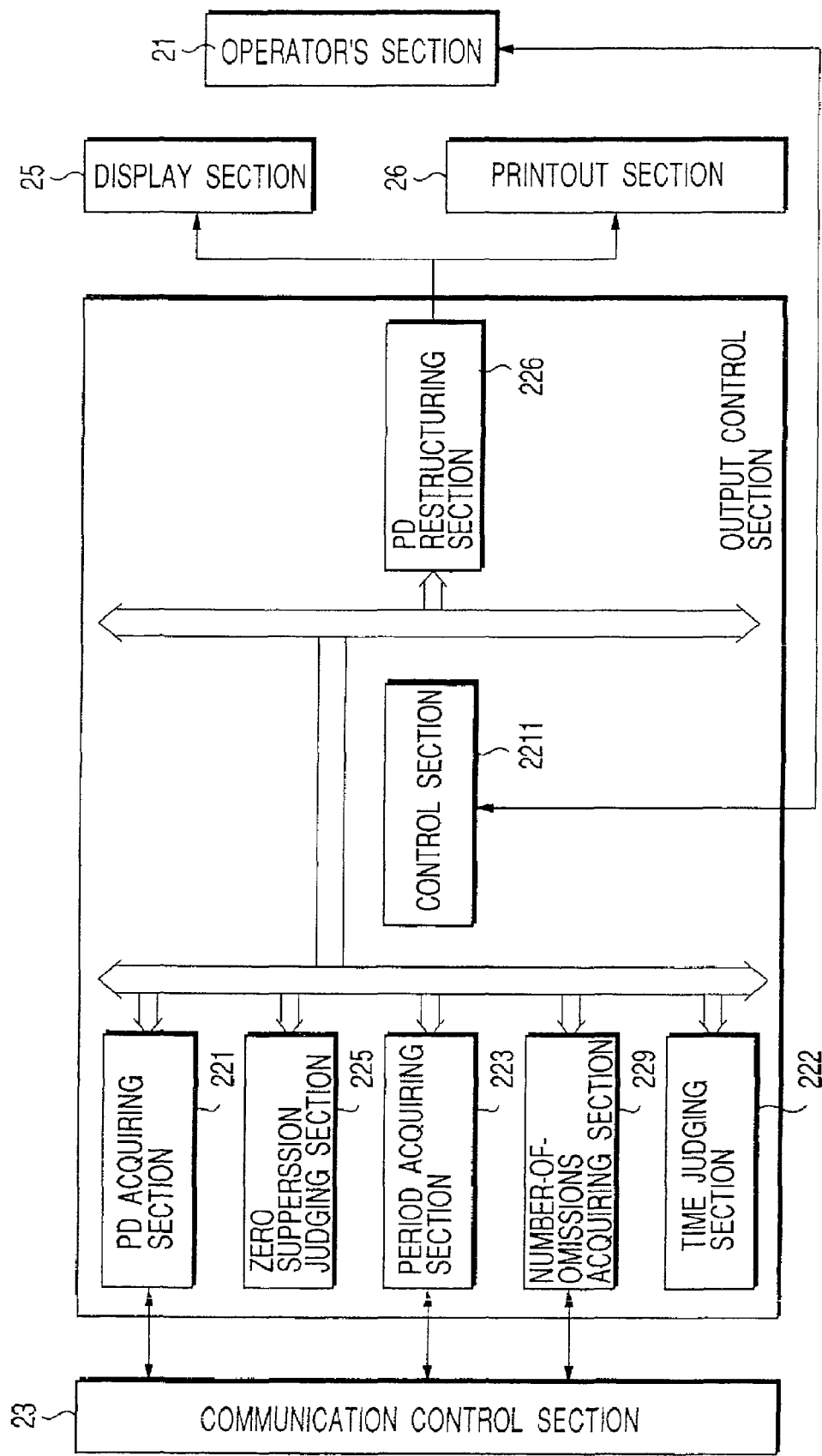
FIG. 5 is a functional block diagram showing the configuration of the output control section 22 in FIG. 4.

FIG. 5 is a functional block diagram of the output control section 22 of FIG. 4. The output control section 22 in the first embodiment comprises a PD acquiring section 221, a time judging section 222, a period acquiring section 223, a zero suppression judging section 225, a PD restructuring section 226, a number-of-omissions acquiring section 229, and a control section 2211.

When the operator requires the output of data via the operator's section 21, the PD acquiring section 221 accepts this operation. Then, the PD acquiring section 221 acquires the performance data according to the retrieval conditions specified by the operation (that is, the retrieval conditions including the time range of the desired data, the required node, and the type of event). In the operation, the PD acquiring section 221 further acquires time TC that the latest performance data was created from the node from which the performance data was read.

The period acquiring section 223 acquires a totalizing period T1 of performance data at the node from which performance data is read.

The time judging section 222 compares the time range the operator requested with Tc and T1 and judges whether the time that performance data is to be created is present after the time range the operator requested. The time that performance data is to be created means the time that performance data is necessarily created in the totalizing period T1 of performance data after time Tc, that is, Tc+T1.

When the time judging section 222 has judged that the time that performance data is to be created is present after the time range the operator requested, the number-of-omissions acquiring section 229 acquires the number Ns of times the creation of performance data was omitted from the node being operated.

Referring to the time range the operator requested and the acquired Ns and T1, the zero suppression judging section 225 judges whether zero suppression is effected at the node being operated.

When the zero suppression judging section 225 has judged that zero suppression has been effected at the node being operated, the PD restructuring section 226 inserts 0s into the indefinite area of the performance data acquired from the node being operated and uses the resulting information for screen display or printout. The indefinite area represents the area where no performance data is stored in the PD accumulating section 27 in the time range the operator requested.

The control section 2211 supervises various control operations in the PD acquiring section 221, time judging section 222, period acquiring section 223, zero suppression judging section 225, PD restructuring section 226, and number-of-omissions acquiring section 229.

The PD acquiring section 221, time judging section 222, period acquiring section 223, zero suppression judging section 225, PD restructuring section 226, number-of-omissions acquiring section 229, and control section 2211 are functions realized by putting a new patch on a conventional program written in, for example, a dedicated language. That is, these functional objects are based on a concept including both hardware and software.

Next, a general explanation of the zero suppression function will be given by reference to FIG. 6. Zero suppression is effected at the PD generating section 14 at each of nodes N1 to Nn.

Figure 6:
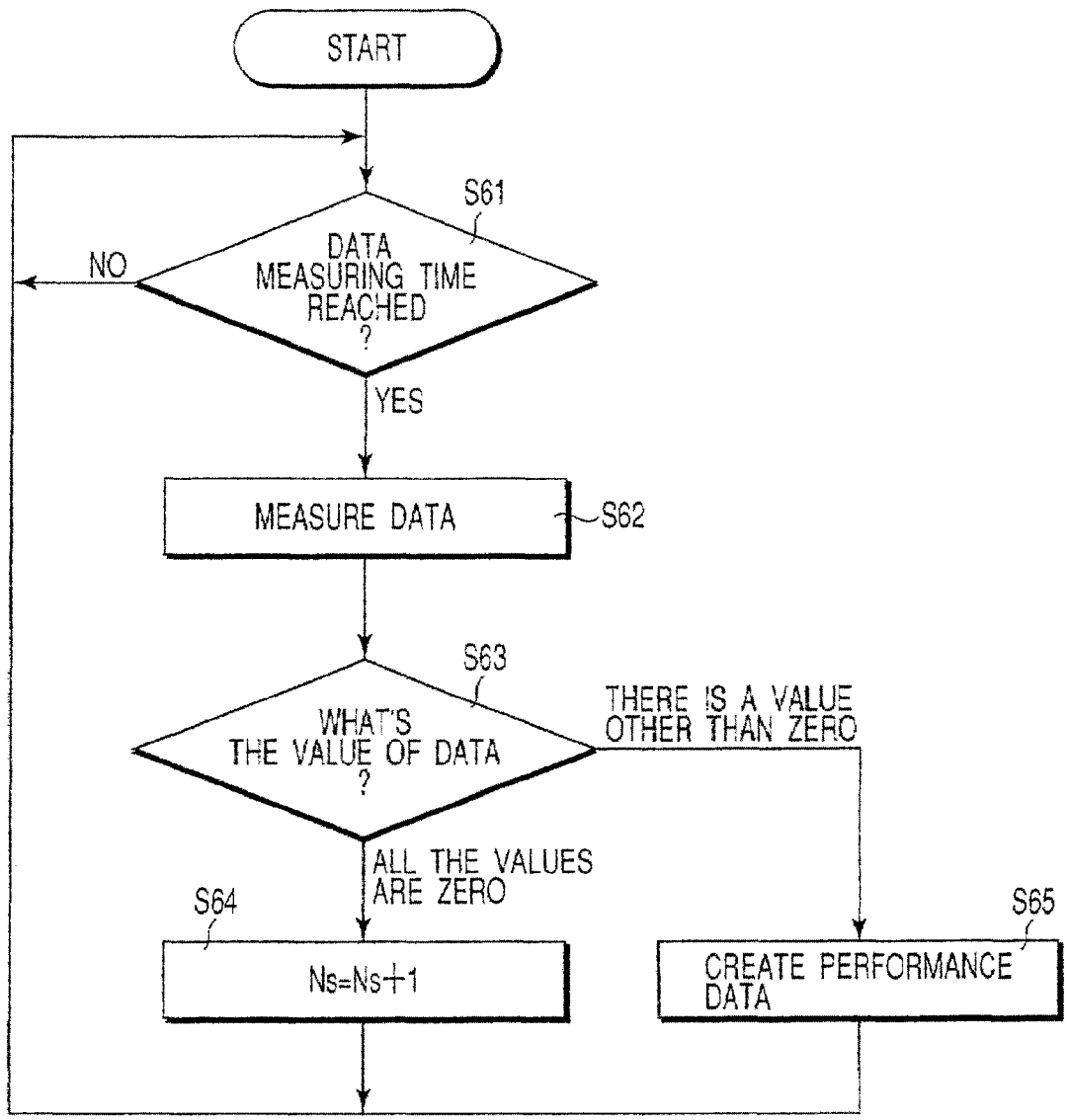
FIG. 6 is a flowchart to help give a general explanation of zero suppression effected at nodes N1 to Nn shown in FIG. 1.

When the measuring time of data is reached at step S61 in FIG. 6, data about each of the monitoring items is measured at step S62. At the next step S63, it is judged whether or not the value of the measured data includes a 0.

In this step, if the data items about all the monitoring items take a value of 0, performance data will not be created and control proceed to step S64. At step S64, the number of times the creation of performance data was skipped, or the number Ns of times the creation of performance data was omitted, is counted up.

On the other hand, at step S63, if there is a monitoring item whose data takes a value other than 0, control will go to step S65, where performance data will be created.

Next, the operation of the above configuration will be described by reference to the flowchart of FIG. 7. The relationship between supervisory control device M1 with nodes N1 will be explained below. The same holds true for the relationship between the other supervisory control devices M2 to Mn and nodes N2 to Nn.

Figure 7A:
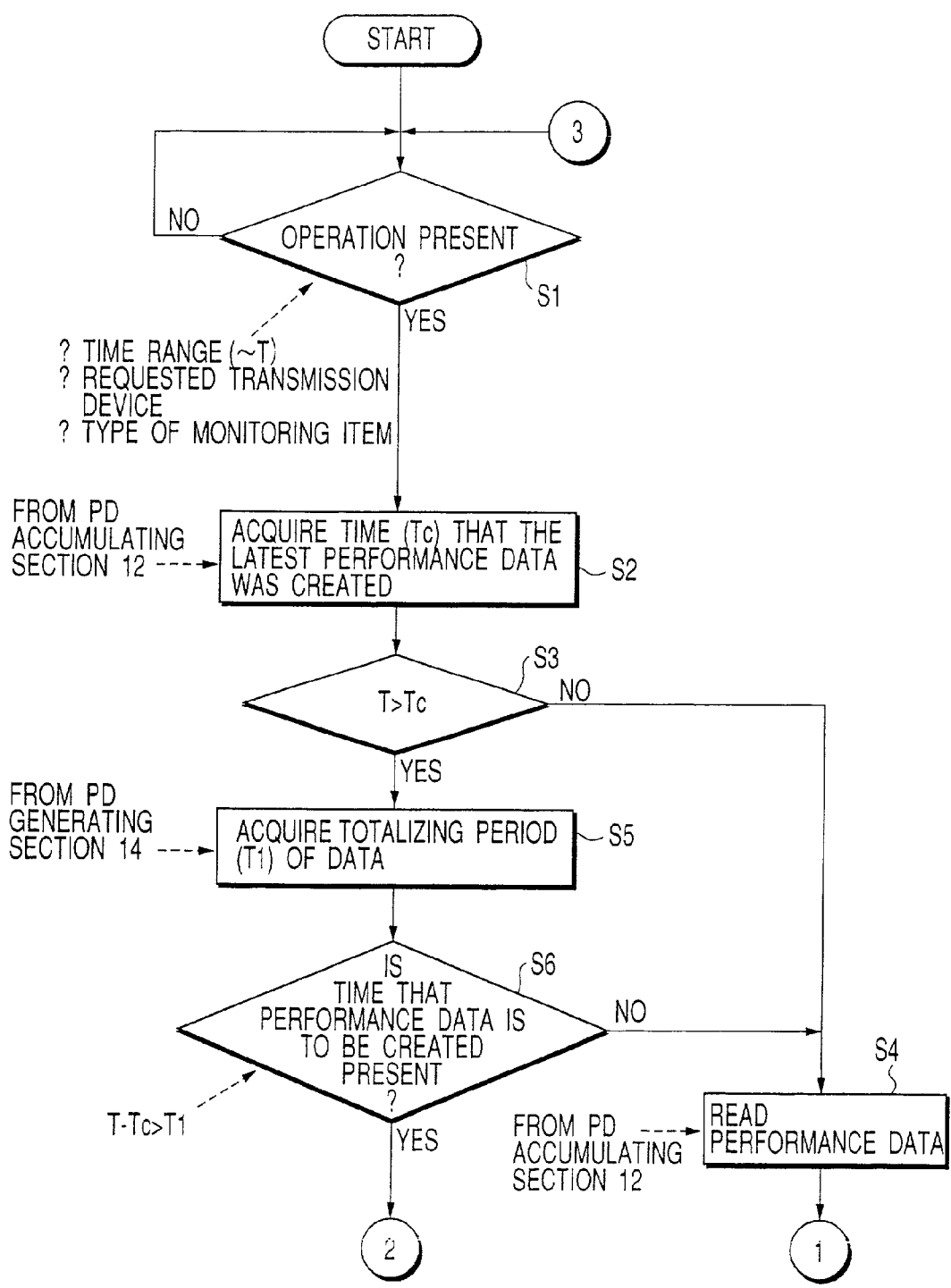
FIGS. 7A and 7B are flowcharts of the procedure for processing at supervisory control devices M1 to Mn in the first embodiment of the present invention.
Figure 7B:
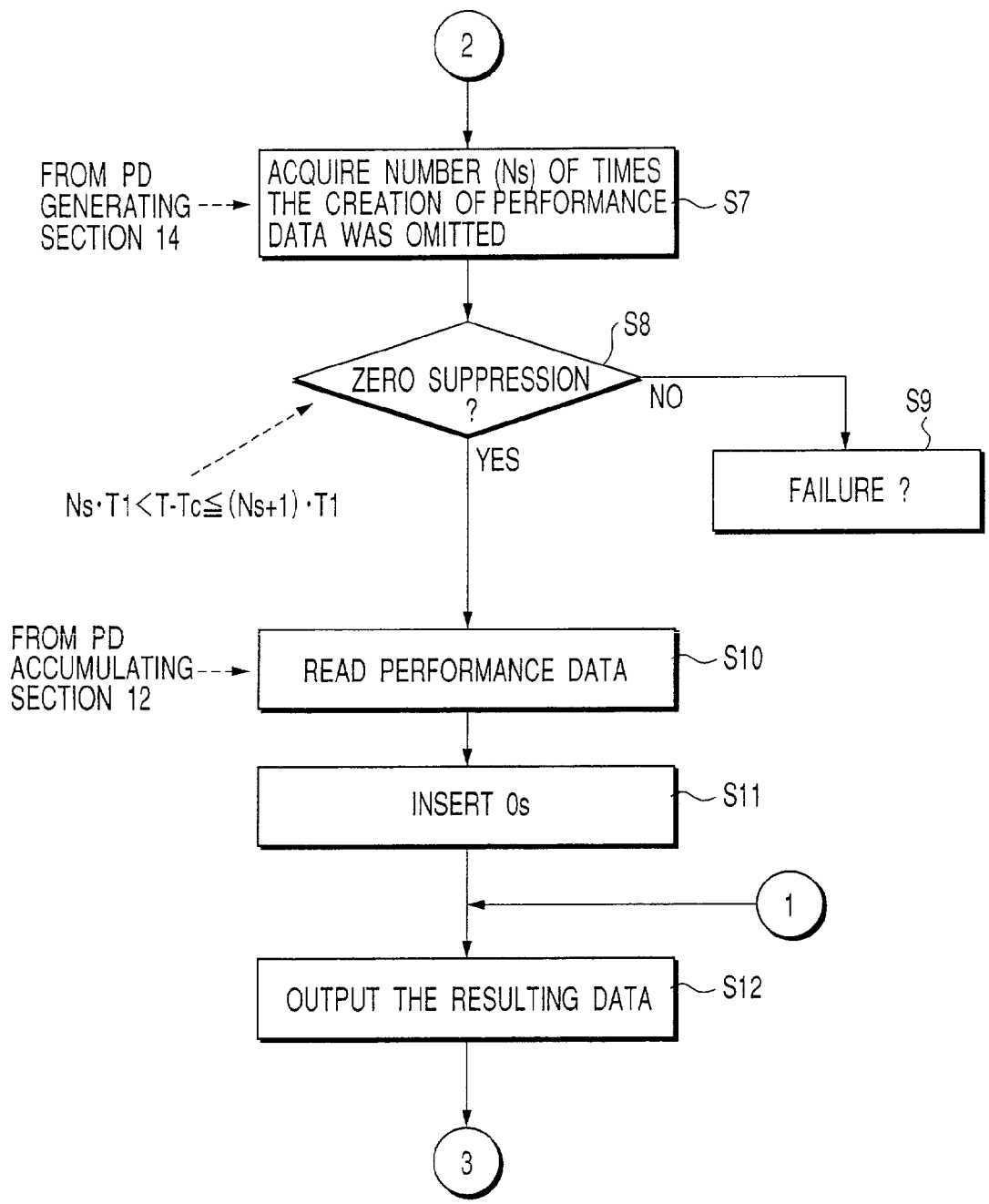

At step S1 in FIG. 7A, supervisory control device M1 waits for an operation. Here, suppose the operator has carried out operations to request the output of data about node N1. That is, it is assumed that the operator has carried out operations to request the display of data about node N1 on the display section 25, the printing out of the display data from the printout section 26, or both of these.

In the request operation, the retrieval conditions, including the time range of the desired data, the identification code of the requested node (here, the one corresponding to node N1), and the type of monitoring item (for example, ES (Erroneous Second)) are set. In the time range of data, the time (the capital letter T) closer to the present time in the time range from time t to time T is important. In the explanation below, time T is referred to as the latest request time T. In a normal case, the latest request time is often set as the present time and the data is specified in such a manner that it belongs to the time range of a specific number of hours before the present time T.

Receiving the request, supervisory control device M1 accesses node N1 and acquires time Tc that the latest one was created in the pieces of performance data stored in the PD accumulating section 12 (step S2). Next, supervisory control device M1 compares the acquired Tc with the latest request time T (step S3). At this step, if T<Tc (N), supervisory control device M1 will read the performance data in the desired time rage from the PD accumulating section 12 (step S4) and output the performance data in the form of screen display or printout (step S12 in FIG. 7B).

On the other hand, when the time range the operator requested includes a time later than time Tc (T>Tc: Y at step S3), whether a time that performance data is to be created is present after the latest request time T becomes a problem. Then, supervisory control device M1 accesses the PD generating section 14 of node N1 and acquires the totalizing period T1 of data (step S5). Then, supervisory control device M1 starts the process of determining the cause of creating no performance data after Tc.

At the next step, supervisory control device M1 judges in the totalizing period T1 whether a time that performance data is to be created is present in the time range from Tc to the latest request time T (step S6). Whether or not a time that performance data is to be created is present can be judged by deciding whether the expression T−Tc>T1 holds. That is, if T−Tc>T1 holds (Y: in the case of true), a longer time than the performance data creating period T1 has elapsed from when the performance data was created last until now. Therefore, since a time that performance data is to be created should be present, the processing of supervisory control device M1 moves to step S7 (see FIG. 7B). At this time, because performance data is considered not to have been created for some reason, its cause is inspected.

On the other hand, at step S6, if T−Tc>T1 does not hold (N: in the case of false), there is no time that performance data is to be created. Thus, there is no problem, when the performance data read from the PD accumulating section 27 is outputted as it is. Therefore, supervisory control device M1 goes to step S4, reads the performance data in the range of the operator's request, and then outputs the performance data in the form of screen display or printout (step S12 in FIG. 7B).

If (Y) at step S6, the performance data corresponding to that time is not in the PD accumulating section 12, although performance data is to be created after the time range the operator requested. If its cause were not determined, the outputted data would be indefinite.

The reason why the performance data that should be present is not in the PD accumulating section 12 is that either any failure has occurred or zero suppression has been effected at node N1.

To determine the cause, supervisory control device M1 accesses the PD generating section 14 of node N1 and acquires the number Ns of times the creation of data was omitted (step S7). Then, supervisory control device M1 judges whether the absence of performance data is attributable to zero suppression effected at nose N1 or to any failure (step S8).

These causes can be distinguished in such a manner that they are caused to correspond to the truth or falsehood of $Ns \cdot T1 < T - Tc \leq (Ns+1) \cdot T1$. That is, if this expression holds (Y: in the case of true), there is no contradiction between the fact that there is no performance data and the number Ns of times the creation of performance data was omitted. Therefore, it can be concluded that the reason why there is no performance data is that zero suppression has been effected at node N1. Consequently, the data in the time range (blank area) absent in the PD accumulating section 12 may be regarded as taking a value of 0. In contrast, if the above expression does not hold (N: in the case of false), any failure is regarded as having occurred and supervisory control device M1 carries out a data restoring process.

If (Y) at step S8, supervisory control device M1 will go to step S10, where it will read performance data, make the data related to the performance data that could not be read 0 (step S11), and restructure the data to be outputted. Finally, supervisory control device M1 outputs the restructured data in the form of screen display or printout (step S12).

As described above, supervisory control devices M1 to Mn in the first embodiment acquire the latest performance data creating time Tc from the called node, when the operator carries out an operation to request the output of data. Then, when supervisory control devices M1 to Mn cannot acquire all the performance data items in the time range requested, they acquire the totalizing period T1 of performance data from the node. Then, supervisory control devices M1 to Mn check whether a time that performance data is to be created is present after time T. If the time is present, supervisory control devices M1 to Mn acquire the number Ns of times the creation of performance data was omitted at the node and check whether zero suppression has been effected at the node. If zero suppression has been effected, supervisory control devices insert 0s into the data they could not be acquired and thereafter output the resulting data.

The insertion of 0s prevents the output column of the performance data from inevitably becoming blank as in the prior art. Even when it is outputted blank, it can be concluded that the blank space is attributable to a failure, not zero suppression, which prompts the user to take suitable action.

Therefore, the transmission system with the zero suppression function can offer as much information the user needs as possible and improve the human-machine interface (HMI).

(Second Embodiment)

Hereinafter, a second embodiment of the present invention will be explained.

FIG. 8 is a functional block diagram showing the configuration of each of nodes N1 to Nn and each of supervisory control devices M1 to Mn in the second embodiment. The configuration of FIG. 8 differs from that of FIG. 4 in that each of supervisory control devices M1 to Mn has a PD accumulating section 27.

Figure 9:
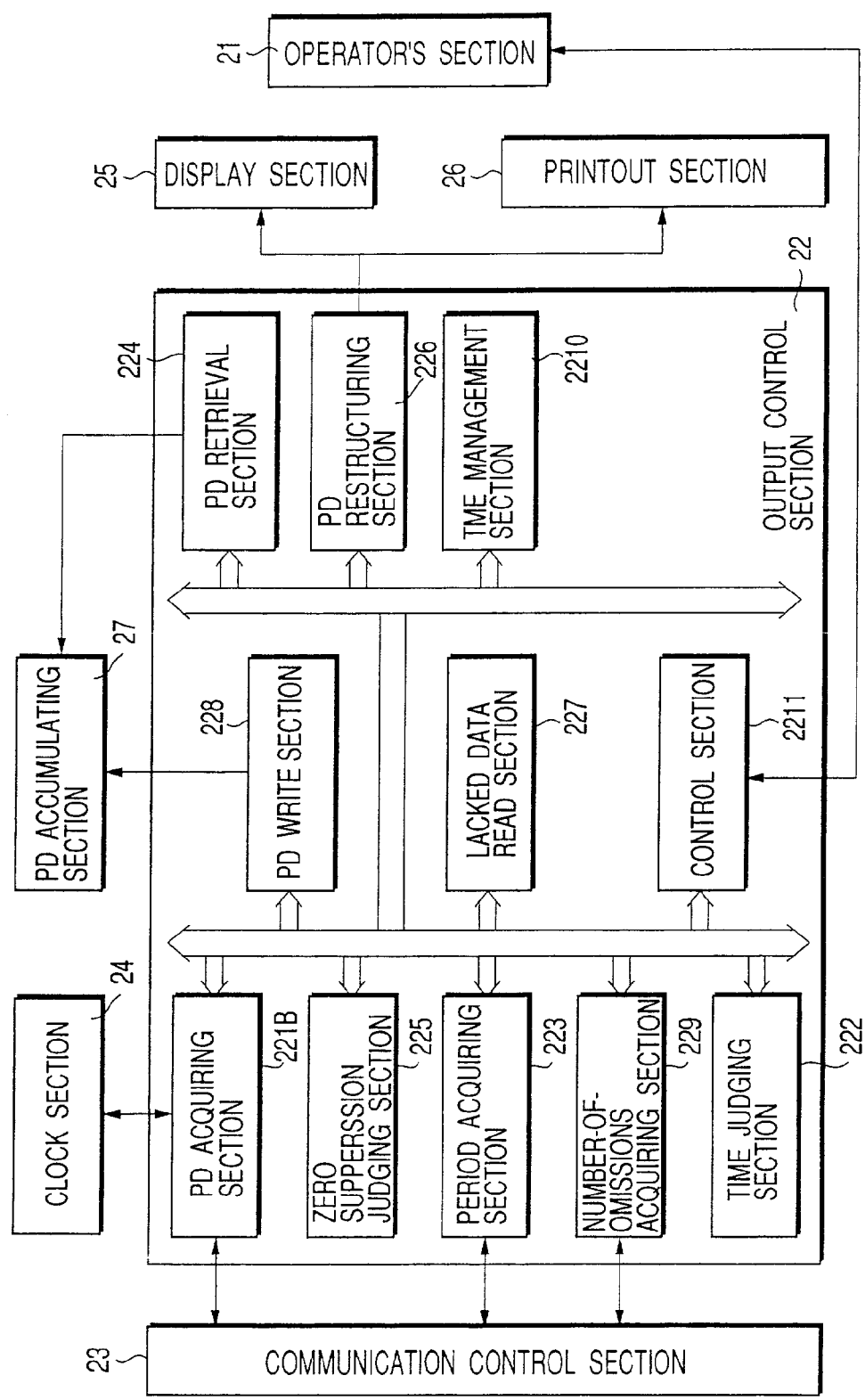
FIG. 9 is a functional block diagram showing the configuration of the output control section 22 in FIG. 8.

FIG. 9 is a functional block diagram of the output control section 22 of FIG. 8. In addition to the configuration of FIG. 5, the output control section 22 of the second embodiment further includes a PD retrieval section 224, a lacked data read section 227, a PD write section 228, and a time management section 2210.

The PD acquiring section 221B of FIG. 9 differs from the PD acquiring section 221 of FIG. 5 in its function. For this reason, the PD acquiring section in FIG. 9 is indicated by a different reference numeral of 221B.

Referring to the time information supplied from the clock section 24, the PD acquiring section 221B acquires the performance data from the individual nodes N1 to Nn at, for example, regular intervals according to a specific schedule.

That is, the PD acquiring section 221B differs from the PD acquiring section 221 of the first embodiment in that it positively acquires the performance data.

The PD retrieval section 224 retrieves the performance data satisfying the retrieval conditions specified by the operator from the PD accumulating section 27 of its own device. The PD write section 228 stores the performance data acquired at the PD acquiring section 221B into the PD accumulating section 27.

When the zero suppression judging section 225 has judged that zero suppression has not been effected at the node being operated, the lacked data read section 227 regards the data as being lacked and acquires the lacked data from the node being operated.

The time management section 2210 stores time Tc that the latest performance data stored in the PD accumulating section 27 was created, while updating the creation time Tc. Particularly when the creation time has not been written in the reported performance data, the time management section regards the time it receives the performance data as the creation time of the performance data.

Figure 10A:
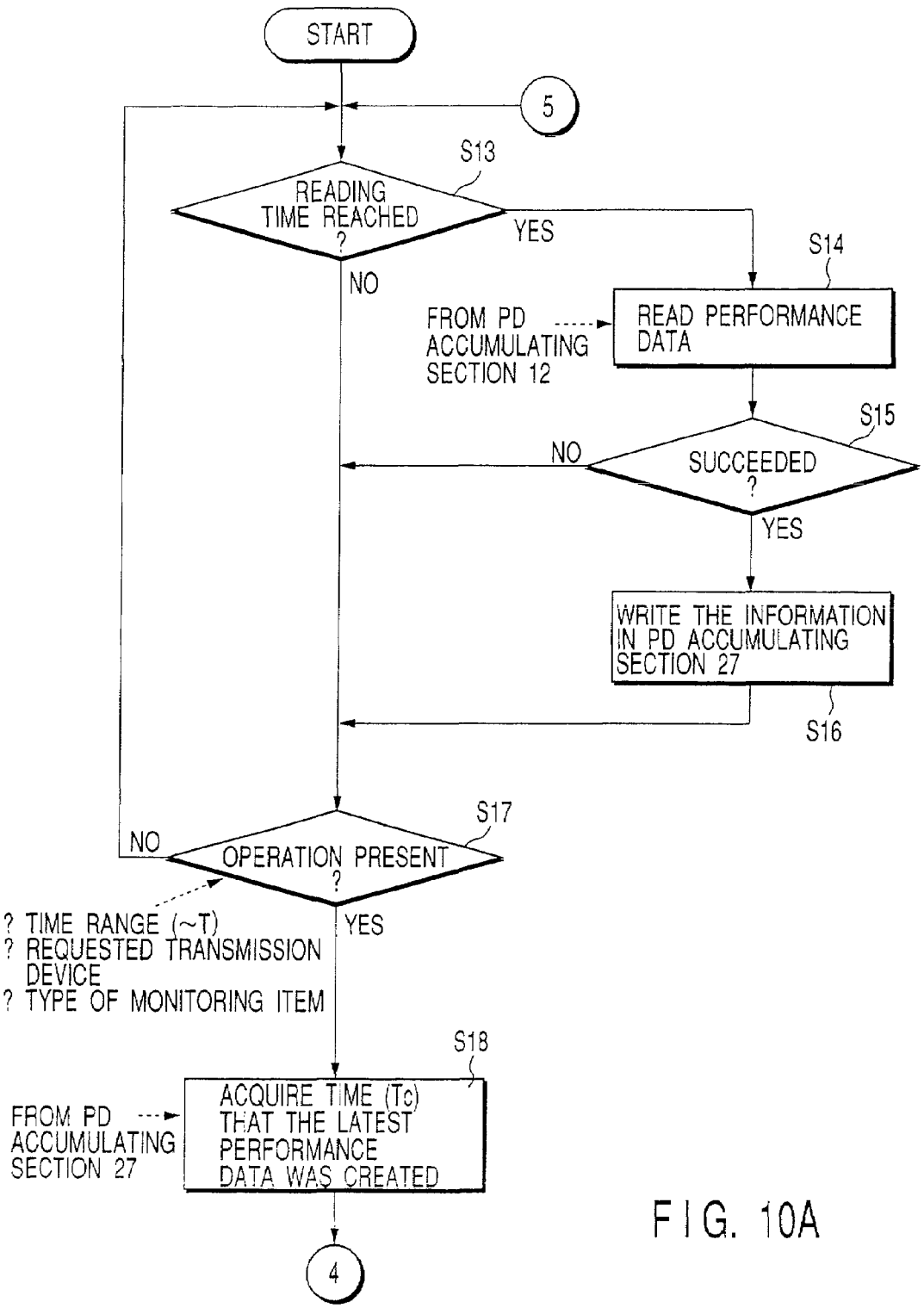
FIGS. 10A and 10B are flowcharts of the procedure for processing at supervisory control devices M1 to Mn in the second embodiment of the present invention.

The operation of the above configuration will be described by reference to the flowcharts of FIGS. 10A and 10B. In FIG. 10A, supervisory control device M1 waists for arrival of performance data reading time or operation by the operator.

When the reading time has been reached at step S13 (Y), supervisory control device M1 reads the performance data from the PD accumulating section 12 of the node (step S14). When the reading process is successful (Y in step S15), supervisory control device M1 writes the read-out performance data into the PD accumulating section 27 (step S16). At that time, the time management section 2210 updates the latest performance data creating time Tc.

Figure 10B:
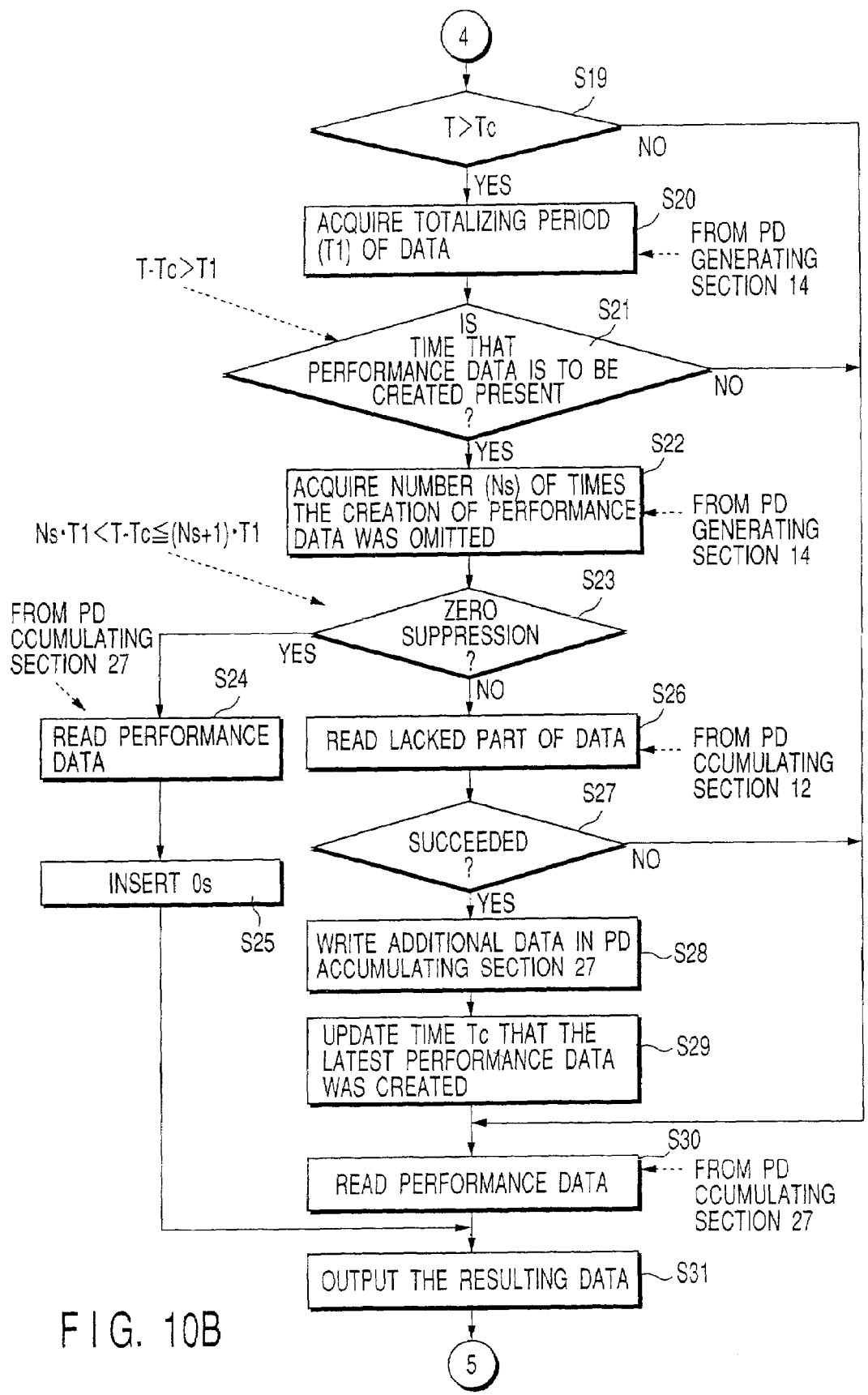

When an operation is carried out at step S17, supervisory control device M1 performs operations according to the procedure in step S18 to step S23 (see FIG. 10B). Since the procedure is the same as that in step S2 to step S8, its explanation will be omitted.

The procedure in the second embodiment, however, differs from that in the first embodiment in that the section from which time Tc is acquired in step S18 of FIG. 10A is the PD accumulating section 27.

If (Y) at step S23 of FIG. 10B, supervisory control device M1 will read the performance data, inserts 0s into the data related to the performance data that could not be read, and then output the resulting information (step S24, step S25, and step S31).

On the other hand, if (N) at step S23, supervisory control device M1 will proceed to step S26, where it will read the lacked data. That is, when (N) at step S23, there is a discrepancy between the number Ns of times the creation of performance data was omitted and time Tc. That is, the data to be stored is not in the PD accumulating section 27. Then, supervisory control device M1 accesses the PD accumulating section 12 of the node, reads the data, and supplements what is stored in the PD accumulating section 12 of its own device.

If failing to read the lacked data (N at step S27), supervisory control device M1 will read the performance data directly from the PD accumulating section 27 and output it (step S30 and step S31). In this case, the data related to the performance data that could not be acquired is outputted in the form of blank spaces.

If the lacked data has been read successfully (Y at step S27), supervisory control device M1 will add the read-out data to the contents of the PD accumulating section 27 (step S28). Then, after supervisory control device M1 updates the latest performance data creating time Tc (step S29), it goes to step S30.

As described above, the second embodiment makes it possible to grasp the situation where the performance data has not reached the supervisory control device, although it has been created. Furthermore, in the second embodiment, when such a situation has occurred, the performance data that did not reached the supervisory control device is read from the database of the node and written into the PD accumulating section 27 of supervisory control devices M1 to Mn. This not only produces the effect explained in the first embodiment but also prevents the data to be recorded in the database on the side of supervisory control devices M1 to Mn from being omitted.

(Third Embodiment)

Next, a third embodiment of the present invention will be explained.

Figure 11:
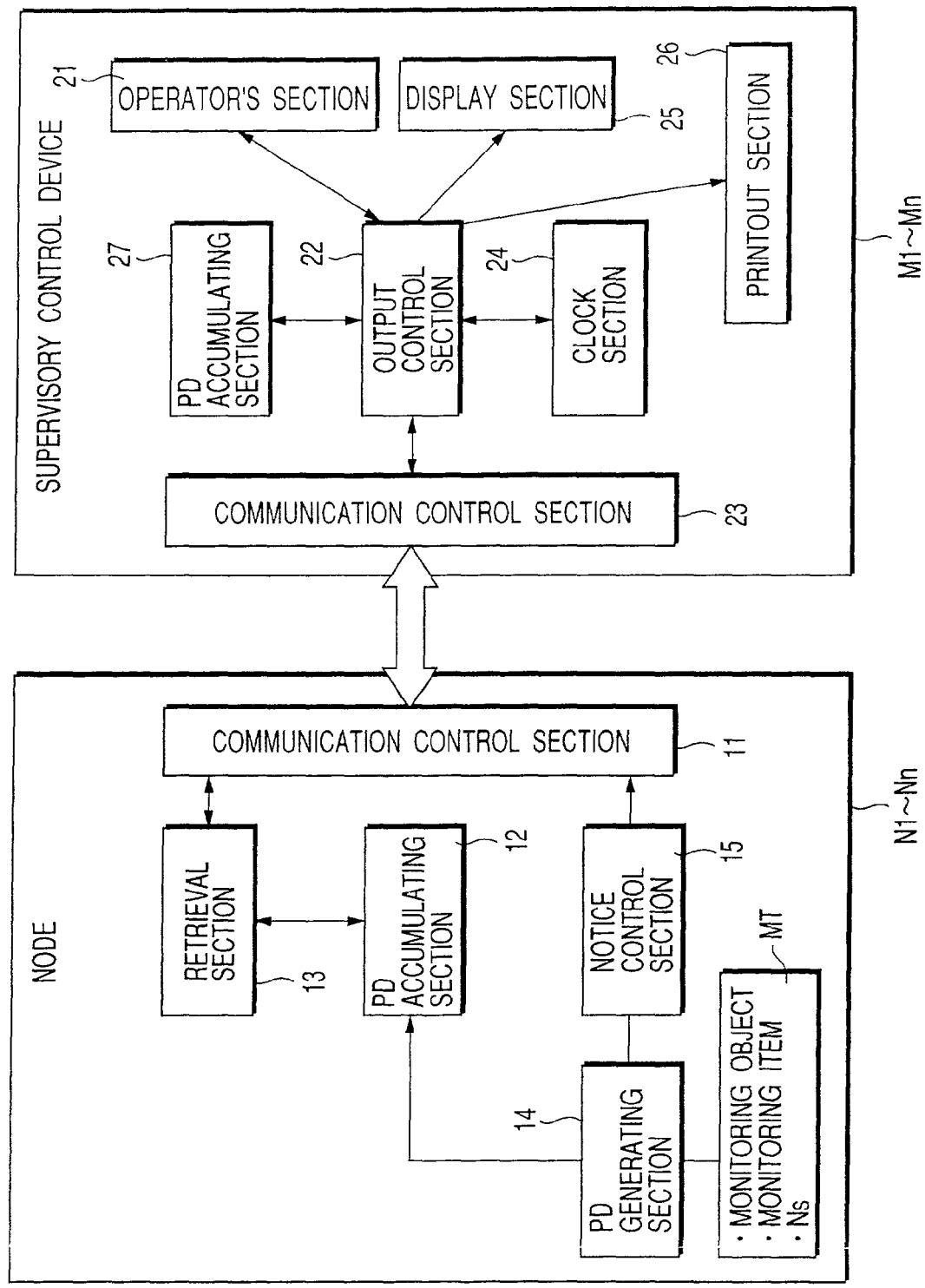
FIG. 11 is a functional block diagram showing the configuration of a third embodiment of the transmission system shown in FIG. 1.

The third embodiment is the same as the second embodiment in each of supervisory control devices M1 to Mn is provided with a database. The system of the third embodiment differs from that of the second embodiment in a method of reporting the performance data. For this reason, the configuration of nodes N1 to Nn in the third embodiment differs from that in the second embodiment. That is, as shown in FIG. 11, each of nodes N1 to Nn includes a notice control section 15. The notice control section 15 automatically notifies the performance data created at the PD generating section 14 to the supervisory control devices without waiting for the request of the supervisory control devices.

Figure 12:
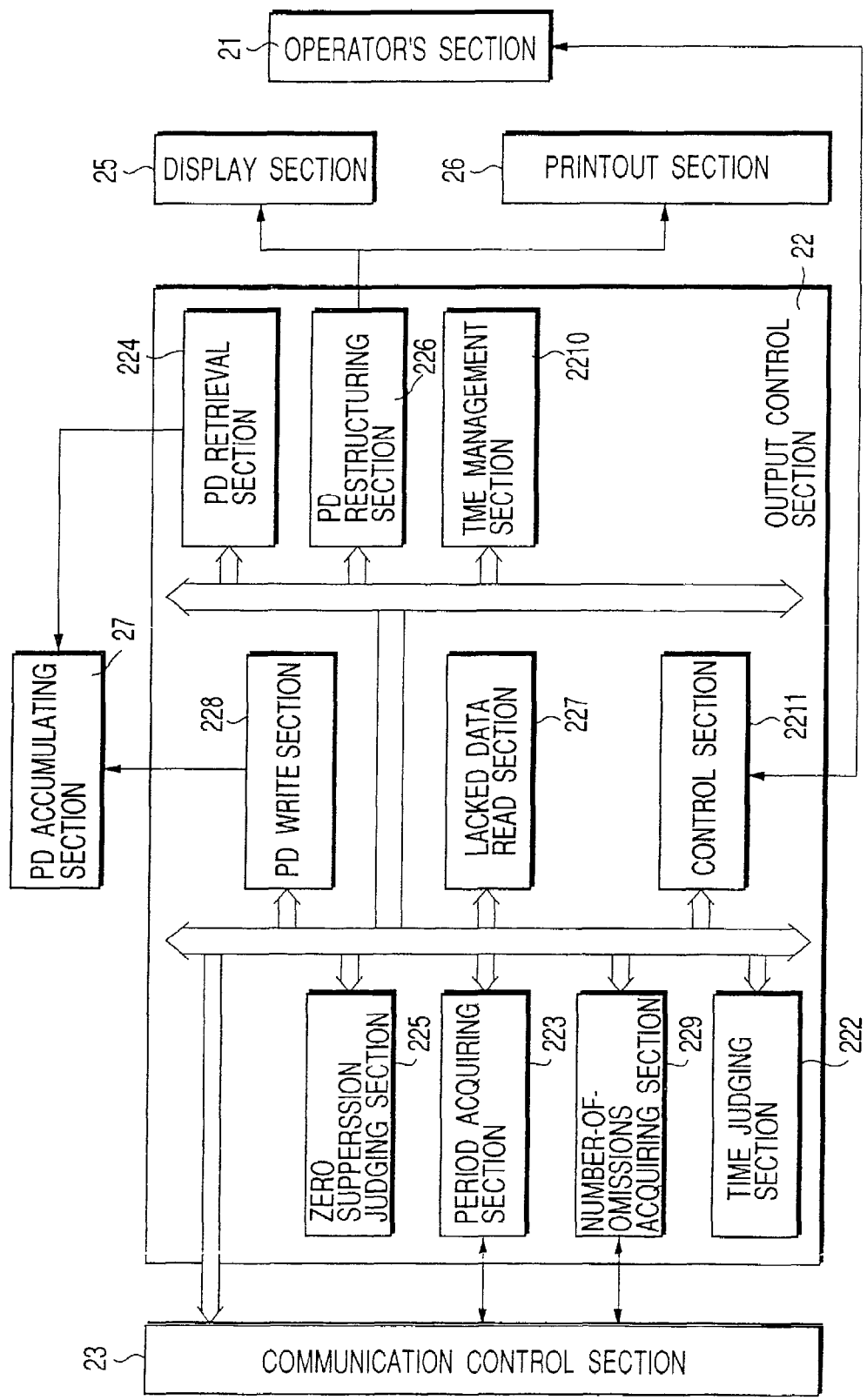
FIG. 12 is a functional block diagram showing the configuration of the output control section 22 in FIG. 11.

FIG. 12 shows the configuration of the output control section 22 of each of supervisory control devices M1 to Mn related to the third embodiment. In this configuration, the PD accumulating section 221B of FIG. 9 is omitted. The reason is that the performance data is reported unilaterally from the node side.

Figure 13:
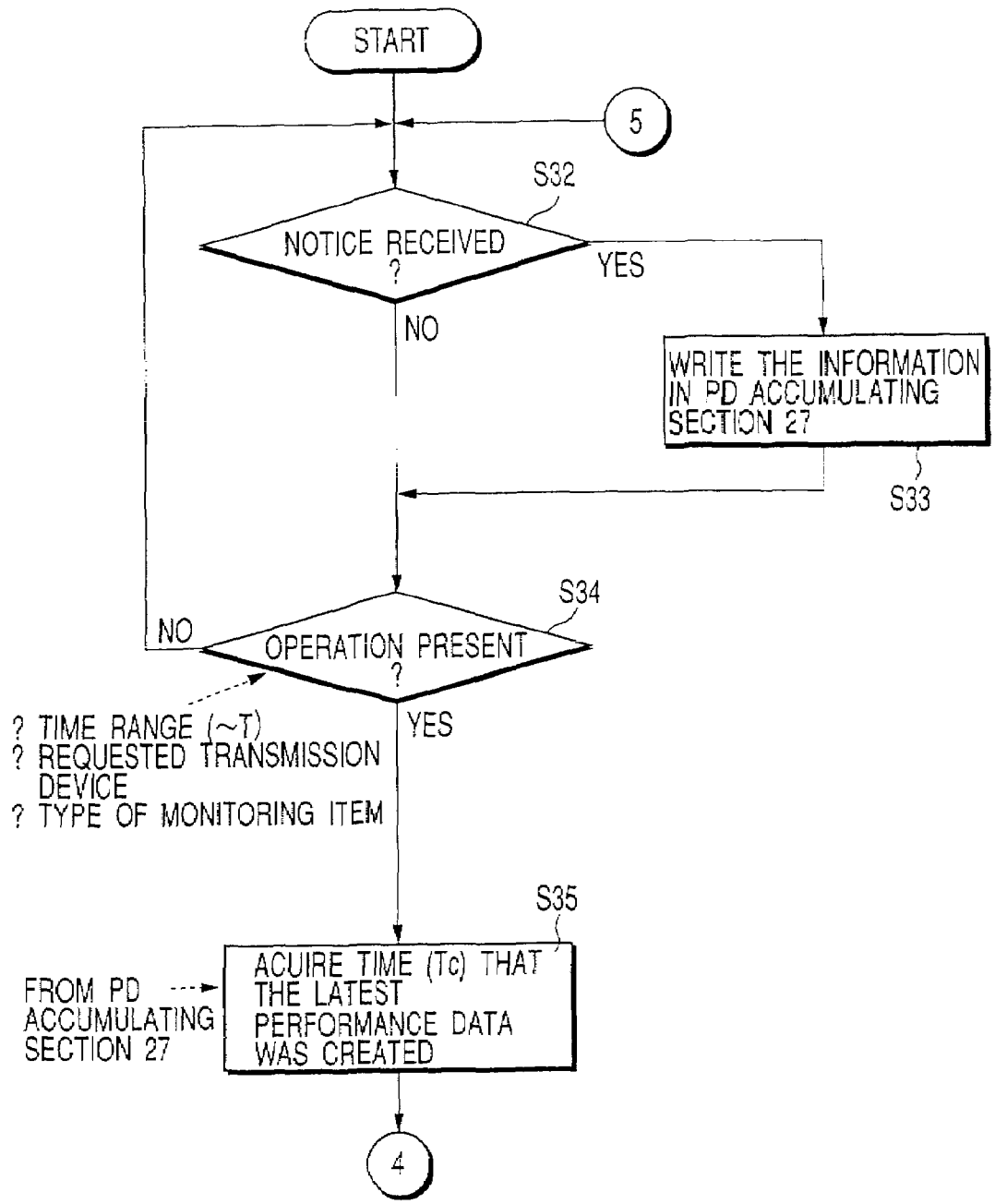
FIG. 13 is a flowchart of the procedure for processing at supervisory control devices M1 to Mn in the third embodiment of the present invention.

Next, the operation in the above configuration will be explained by reference to the flowcharts in FIG. 13 and FIG. 10B. In FIG. 13, supervisory control device M1 waits for notice of performance data from nodes N1 to Nn (step S32). When having received performance data, supervisory control device M1 writes the received performance data in the PD accumulating section 27 of its own device (step S33). Next, supervisory control device M1 waits for an operation by the operator (step S34). When there is no operation (N), the loop of step S32 to step S34 is continued.

In this state, when an operation is executed, supervisory control device M1 proceeds to step S35, where it acquires the latest performance data creating time Tc. Then, supervisory control device M1 goes to step S19 of FIG. 10B, where it follows the same procedure as that in the second embodiment.

Doing this, the third embodiment produces the same effects as those of the first and second embodiments, except that the way supervisory control devices M1 to Mn acquire the performance data differs.

(Fourth Embodiment)

Next, a fourth embodiment of the present invention will be explained.

Figure 14:
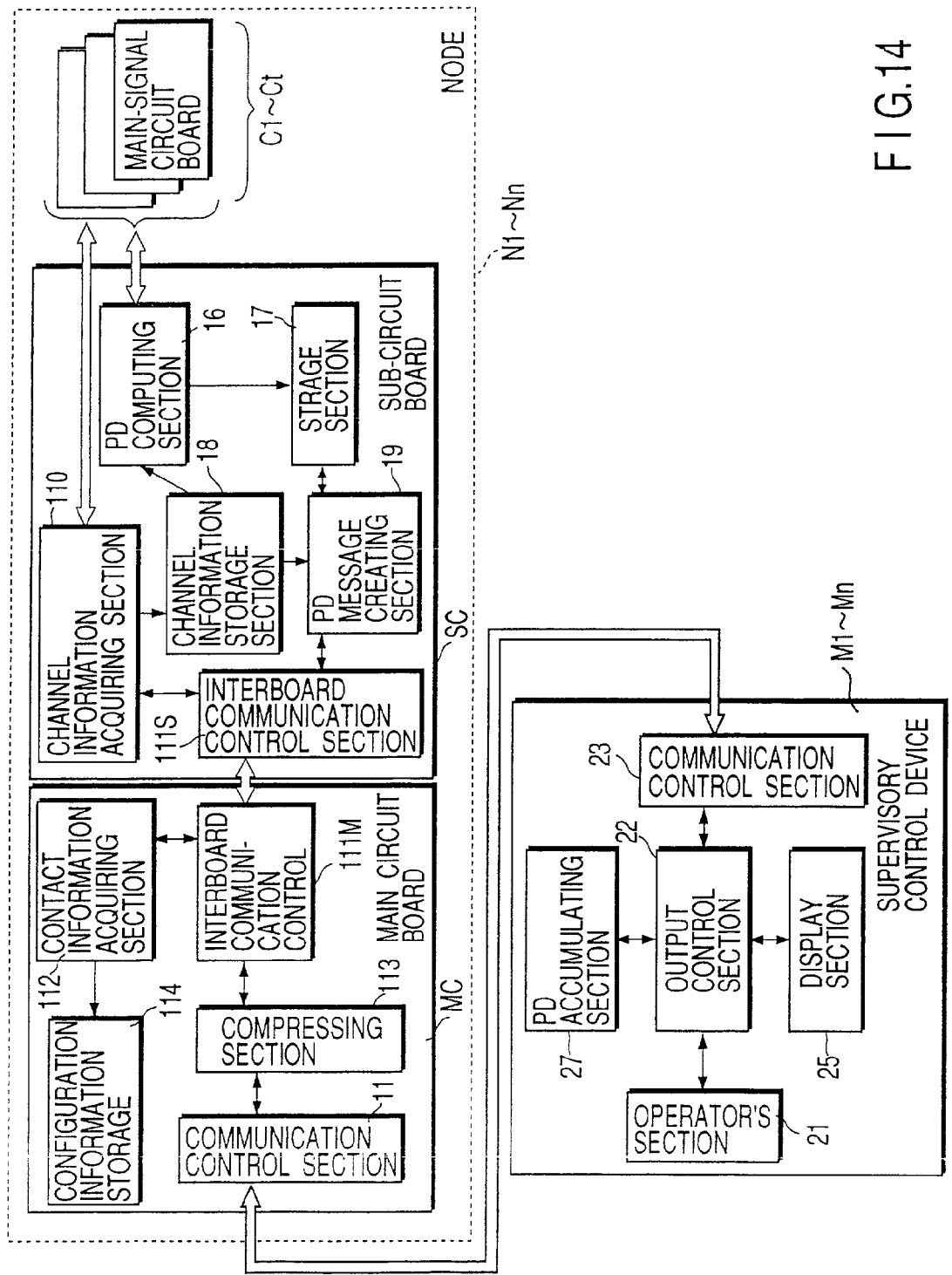
FIG. 14 is a functional block diagram showing the configuration of a transmission system according to a second embodiment of the present invention in FIG. 1.

FIG. 14 shows the configuration of each of nodes N1 to Nn and each of supervisory control devices M1 to Mn related to the fourth embodiment. In FIG. 14, the same parts as those in FIGS. 4, 8, and 11 are indicated by the same reference numerals and only the different parts will be explained. The configuration of supervisory control devices M1 to Mn is the same as that in FIG. 4 and therefore only nodes N1 to Nn will be described.

In FIG. 14, each of nodes N1 to Nn includes main-signal circuit boards C1 to Ct, a sub-circuit board SC, and a main circuit board MC. The main-signal circuit boards C1 to Ct, sub-circuit board SC, and main circuit board MC are installed in the form of cards that can be inserted and removed into and from a general-purpose shelf (not shown).

The main-signal circuit boards C1 to Ct correspond to the live high-speed interface section (HS I/F) 1-0, the standby high-speed interface sections 1-1, TSA2-0, 2-1, and low-speed interface sections (LS I/F) 3-1 to 3-$k$ in FIG. 2.

The main circuit board MC corresponds to the main control section 5 of FIG. 2.

The sub-circuit board SC corresponds to the sub-control board provided in either the HS I/F or LS I/F of FIG. 2. The sub-circuit board SC may be provided in the main circuit board 5.

The sub-circuit board SC includes a performance data computing section (hereinafter, referred to as a PD computing section) 16, a performance data storage section (hereinafter, referred to as a storage section) 17, a channel information storage section 18, a PD message creating section 19, a channel information acquiring section 110, and an interboard communication control section 111S.

The PD computing section 16 monitors the state of the main-signal circuit boards C1 to Ct and totalizes the data items related to the high-speed circuits OF and low-speed circuits LL at intervals of 15 minutes every day. From the totalized data, the PD computing section calculates performance data. The calculated performance data is stored in the PD storage section 17.

FIG. 15 illustrates how the performance data is stored in the PD storage section 17. As shown in FIG. 15, the performance data is stored for each of the channels (Ch1, Ch2, . . . ) in such a manner that it is caused to correspond to a plurality of management sections (RS (Remote Section), MS (Multiplex Section), and PS (Path Section)).

The channel information acquiring section 110 receives information about whether the low-speed I/Fs have been installed in shelves 3-1 to 30$k$ and about the type of boards from the main-signal circuit boards C1 to Ct. Then, on the basis of the received information, the channel information acquiring section 110 acquires the configuration information about the circuit boards. The configuration information is written in the channel information storage section 18.

The main-signal circuit boards C1 to Ct include plural types of circuit boards: they are STM-1, STM-4, STM-16, and STM-64. The plural types of circuit boards are dealt with by writing information indicating the type of board into Bit 0 to Bit 3 set in the storage area of the channel information storage section 18. The information indicating the type of circuit board is acquired by the channel information acquiring section 110.

The channel information acquiring section 110 receives create information (or information about a new channel or the creation of a new path) about the APS (Automatic Protection Switching) function many SDH units have from an APS function object in the form of messages. The received APS create information is written into Bit 5 of the channel information storage section 18.

The PD message creating section 19 reads each piece of performance data stored in the PD storage section 17. Referring to the read-in information and the mounting state of the circuit board of each channel acquired from the channel information storage section 18, the PD message creating section 19 creates a performance data message. The created performance data message is transferred to a compressing section 113 in the main circuit board MC via the interboard communication control sections 111S, 111M.

When the message is transferred, if the compression information in the channel information storage section 18 is set to 0 (that is, no compressing is done), the data will not be compressed at the sub-circuit board SC. As a result, the performance data message about all the channels mounted in the shelves will be transferred directly to the compressing section 113.

On the other hand, if the compression information is set to F (that is, compressing is done), the data will be compressed at the sub-circuit board SC. Then, the performance data about all the channels mounted in the shelves will be compressed, thereby creating a performance data message. The performance data message will be transferred to the compressing section 113.

The interboard communication control section 111S performs data communication with the main circuit board MC.

On the other hand, the main circuit board MC includes not only the communication control section 11 communicating with supervisory control devices M1 to Mn but also an interboard communication control section 111M, a contact information acquiring section 112, the compressing section 113, and the configuration information storage section 114.

The interboard communication control section 111M performs data communication with the sub-circuit board SC.

The contact information acquiring section 112 reads the contact information and writes it into the configuration information storage section 114. The contact information is information indicating the state of the low-speed I/Fs 3-1 to 3-k mounted in the shelves. The contact information is set beforehand in the nodes by using dip switches (Dip Sw) or the like. Since there are several types of circuit boards in the shelves at the same time, 4 bits (Bit 0 to Bit 3) are given to each shelf as shown in FIG. 17, thereby distinguishing the types of circuit boards.

Information on each shelf, including the compression information and contact information, is transferred to the channel information acquiring section 110 via the interboard communication sections 111M, 111S, when the node is started up.

The compressing section 113 changes the compression unit of performance data on the basis of the configuration information acquired from the channel information acquiring section 110 and compresses the performance data message received from the PD message creating section 19 according to the changed unit. The compression unit of performance data varies according to the configuration information about the node.

Receiving the performance data message from the PD message creating section 19, the compressing section 113 checks the compression information in the corresponding shelf in the configuration information storage section 114. If the result of the check has shown that the compression information has a value of 1, meaning that the received performance data has been compressed, the compressing section 113 will transmit the performance data message to the output control section 22 of supervisory control device M1. If the result of the check has shown that the compression information has a value of 0, the compressing section 113 compresses the performance data about all the shelves, thereby creating a performance data message. Then, the compressing section 113 transmits the created performance data message to the output control section 22 of supervisory control device M1.

The output control section 22 of each of supervisory control devices M1 to Mn is provided with the function of storing the performance data in a decompressed state in the PD accumulating section 27, when the section 22 has received the compressed performance data.

Figure 18:
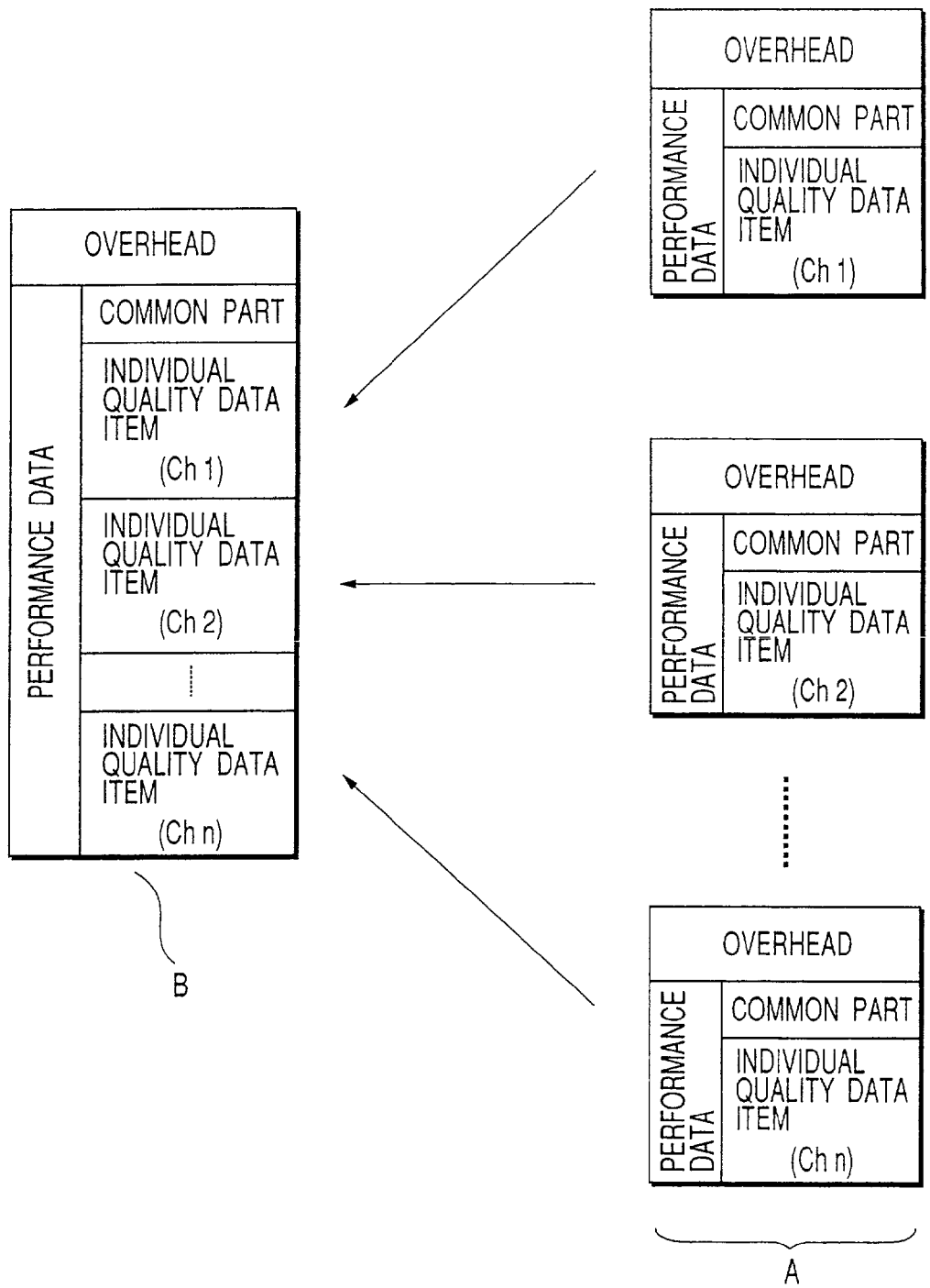
FIG. 18 shows an example of the structure of the performance data notified to supervisory control devices M1 to Mn in the second embodiment of the present invention.

FIG. 18 shows the structure of the performance data reported to supervisory control devices M1 to Mn. In FIG. 18, the letter A indicates a performance data message created at the PD message creating section 19. The letter B indicates notifiable performance data created at the compressing section 113.

Each performance data message (the letter A) has an overhead, performance data, a common part, and individual quality data items. The overhead includes the class of objects reporting the overhead of the OSI protocol and performance data messages, instances, and reporting time.

The common part is the part where the same information is written in each piece of performance data and has pieces of information, including the data totalizing interval, suspect interval value, and the number of zero suppressions. Each data item includes an instance indicating a channel and a data item for each channel.

Figure 19:
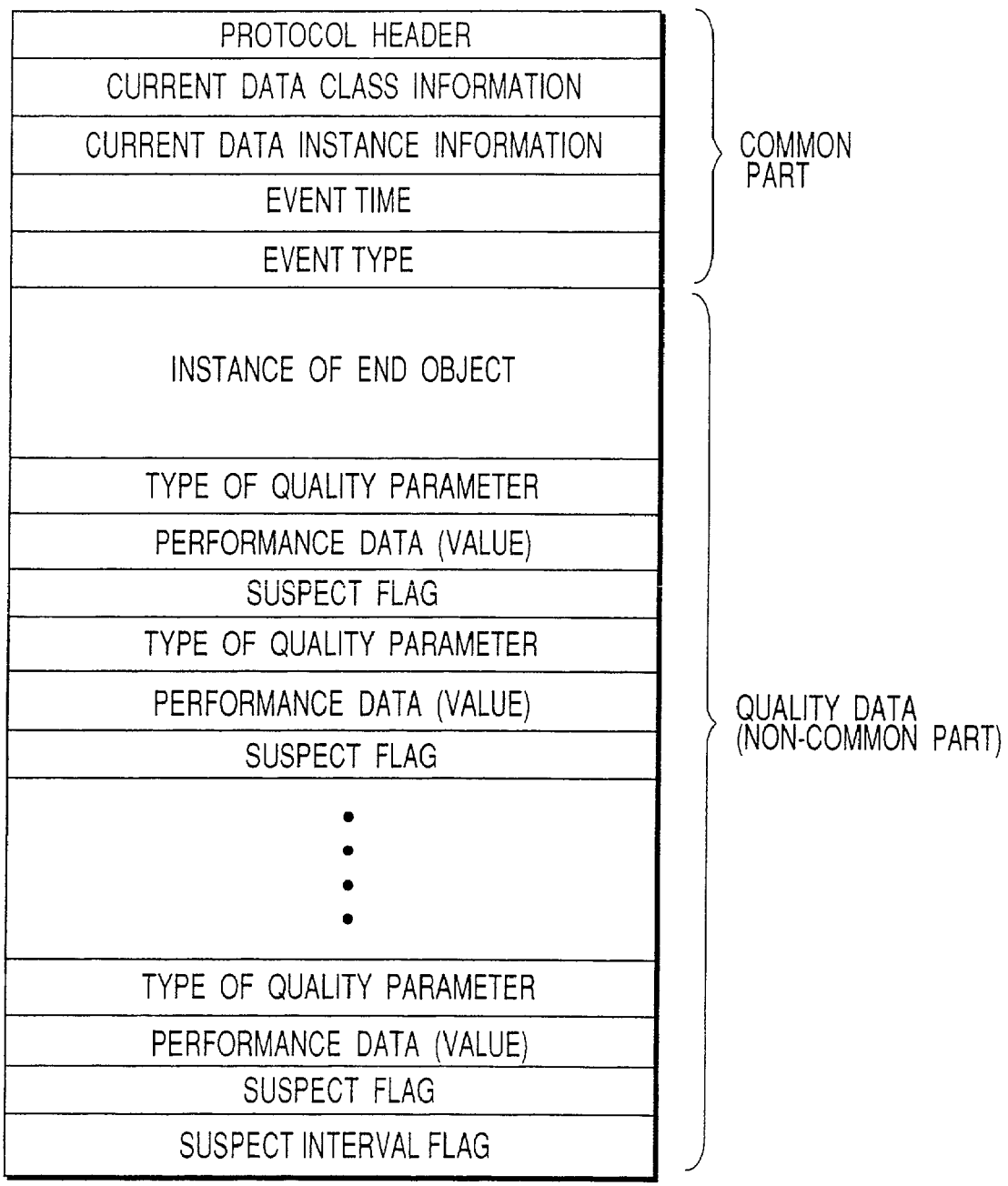
FIG. 19 shows a concrete example of a performance data message.

FIG. 19 shows a concrete example of a performance data message. In FIG. 19, the part from the protocol header to Event Type is for common use. The remaining part from the instance of the end object to Suspect Interval Flag is the part that characterizes the individual data items, or cannot be used in common. Particularly when the CMIP (Common Management Information Protocol) is used as a network monitoring protocol, the size of the common part is large, occupying about 40% of all the bits constituting the message.

In the fourth embodiment, the performance data reported to supervisory control devices M1 to Mn is created by adding each quality data item to one common-use part as shown by the letter B in FIG. 18. This makes it possible to reduce the number of pieces of performance data used for notice. The overhead part is also put together, suppressing the length of the message. Consequently, it is possible to reduce the amount of information in notifying the performance data to supervisory control devices M1 to Mn.

Since the fourth embodiment puts together the common part that occupied 40% of the total amount of data in the prior art, it reduces the data size remarkably. From these, it is possible to ease the communication burden on the supervisory control devices and the nodes and the burden on the supervisory control devices.

(Fifth Embodiment)

Hereinafter, a fifth embodiment of the present invention will be explained.

FIG. 20 shows the configuration of nodes N1 to Nn related to the third embodiment. In FIG. 20, the same parts as those in FIGS. 4, 8, 11, and 14 are indicated by the same reference numerals and only the different parts will be explained.

In the third embodiment, each of main-signal circuit boards C1 to Ct includes a reception section 117 and a data memory 118. The reception section 117 receives an STM signal. Receiving the STM signal, the reception signal 117 measures data, such as the communication quality of the STM signal. The measured data is supplied to the PD computing section 16 of a sub-circuit board SC via the data memory 118.

The PD computing section 16 calculates performance data on the basis of the given data. The created performance data is supplied via the PD storage section 17 to the PD message creating section 19. The message creating section 19 creates a performance data message on the basis of the given performance data. A transmission section 119 informs supervisory control devices M1 to Mn of the performance data message.

In FIG. 20, each of nodes N1 to Nn includes a timing control section 115 and a timing setting section 116. According to each performance data message, the timing control section 115 changes the timing of notifying the performance data message to supervisory control devices M1 to Mn. The timing setting section 116 sets the timing of notifying each performance data message in the timing control section 115 on the basis of the configuration information of its own device stored in the configuration information storage section 114.

The PD message creating section 19 reads the data from the PD storage section 17 with the timing set in the timing control section 115, creates a performance data message, and notifies the performance data via the main circuit board MC to supervisory control devices M1 to Mn.

(Sixth Embodiment)

Figure 21:
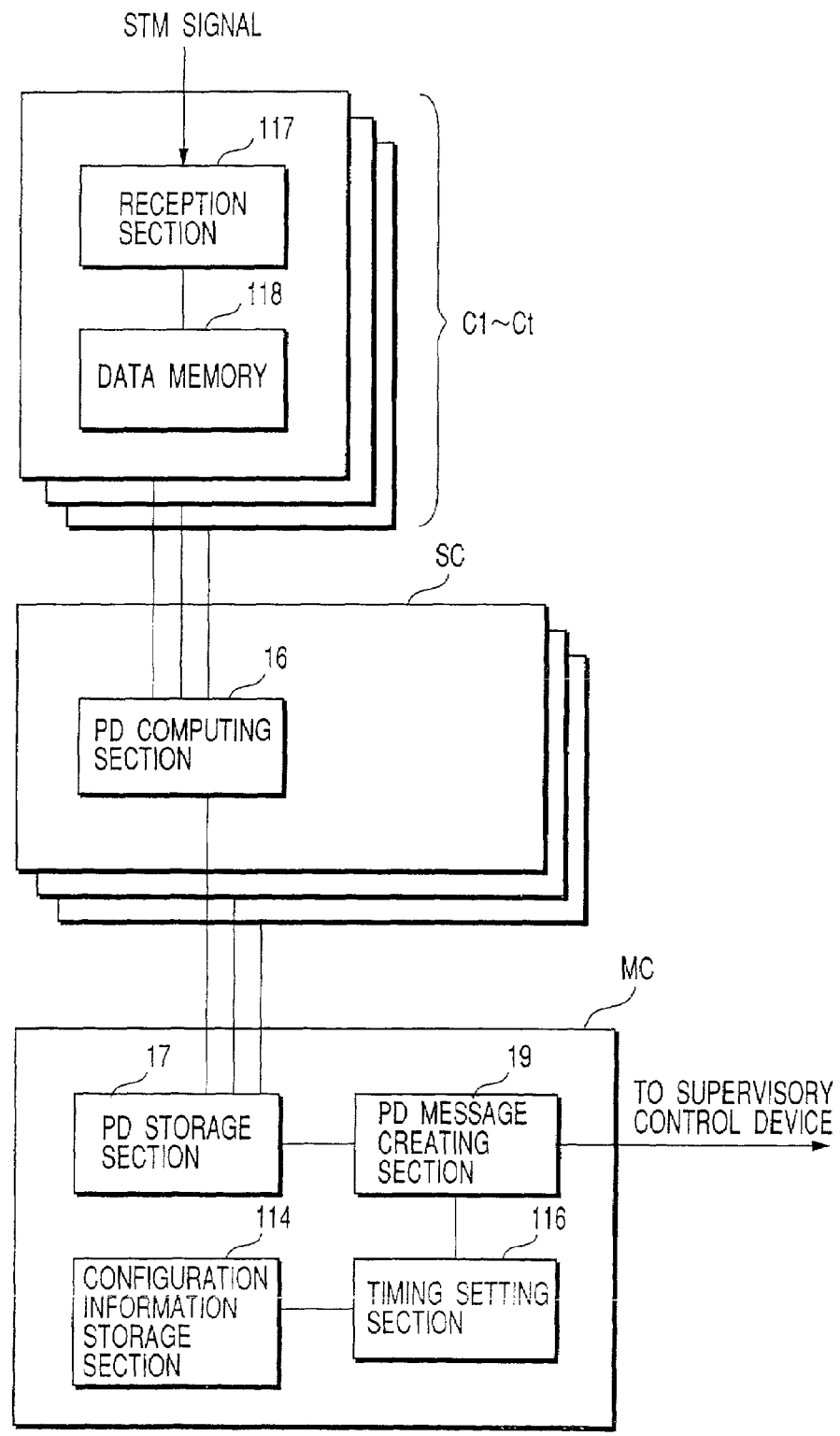
FIG. 21 is a functional block diagram showing the configuration of a modification of the third embodiment in FIG. 20.

FIG. 21 shows a modification of the fifth embodiment is shown as a sixth embodiment of the present invention. In the configuration of FIG. 21, the main circuit board MC is provided with the function of creating a performance data message. The procedure up to creating performance data is the same as described above. The performance data created at the PD computing section 16 is written in the PD storage section 17 of the main circuit board MC.

The timing setting section 116 gives the timing of notifying the performance data message to the PD message creating section 19. The PD message creating section 19 reads each piece of performance data from the PD storage section 17 with the timing set by the timing setting section 116. The read-out performance data is notified as a performance data message to supervisory control devices M1 to Mn.

As described above, in the sixth embodiment, the timing of notifying each performance data message is set arbitrarily. Each performance data message is reported to supervisory control devices M1 to Mn with arbitrarily set timing. That is, in the sixth embodiment, a time lag is given to each performance data message, which is then reported to supervisory control devices M1 to Mn.

Generally, supervisory control devices M1 to Mn exchange various types of information, including performance data, with nodes N1 to Nn. When nodes N1 to Nn report the performance data to supervisory control devices M1 to Mn, some degree of transmission delay is allowed. The alarm information sensed at nodes N1 to Nn, however, must be reported to supervisory control devices immediately after it is sensed.

In the conventional system, the created performance data was notified to supervisory control devices M1 to Mn in such a manner that it was concentrated in a short time. As a result, in a case where the performance data was reported and at the same time, the alarm was given, the amount of information became too large and a delay sometimes occurred in the timing of reporting the alarm to supervisory control devices M1 to Mn.

In the recommendation, it has been decided that, in this type of transmission system, each node should create performance data at predetermined specific intervals of time. Each node unit notifies the supervisory control devices of the periodically created performance data immediately each time the performance data is created. For this reason, in the conventional system, the nodes inform the performance data to the supervisory control devices all at once, regardless of whether the zero suppression function is present or not. As a result, traffic for reporting the performance data may concentrate in a short time.

If the concentration of such traffic has occurred, the processing burden on the management network and supervisory control devices will increase rapidly. If the processing burden on the supervisory control devices exceeded their limit, processes of greater importance, such as the process of informing the operator of the occurrence of the alarm, might be delayed. Particularly when a failure occurs in the network, the amount of information reported to the supervisory control devices increases sharply, which is liable to cause such a delay. Moreover, as the recent networks are getting larger in size, the number of nodes installed is increasing steadily. Thus, it is urgent to alleviate the processing burden particularly on the supervisory control devices.

With the sixth embodiment, the performance data message is notified to supervisory control devices M1 to Mn with random timing. As a result, the traffic related to the transmission of the performance data message is averaged, which alleviates a delay in reporting the performance data.

Furthermore, in the conventional system, the traffic is liable to concentrate in reporting the performance data. When the traffic has concentrated, the operator of a supervisory control device performs remote control of an arbitrary node, there may be a delay in the response from the node to the operator's act. In such a situation, there is a possibility that erroneous operation or faulty operation may take place. Since the nodes in the sixth embodiment can average the traffic related to information communication between nodes N1 to Nn and supervisory control devices M1 to Mn, the aforementioned disadvantages can be eliminated.

As described above, with the present invention, it is possible to ease the burden of communication between the supervisory control devices and the nodes and the burden on the supervisory control devices.

The present invention is not limited to the above embodiments. For instance, while in the embodiments, a system complying with the SDH standard has been used and concrete examples of applying the present invention to the SDH standard have been explained, the invention may be applied to the SONET standard in the U.S. similar to the SDH standard.

As has been explained, with the present invention, it is possible to provide a transmission system which has a zero suppression function and is capable of offering information the user needs as much as possible to achieve an improved human-machine interface (HMI), a supervisory control device, and a method of outputting the data in the supervisory control device. In addition, according to the invention, it is possible to provide a node which alleviates the burden of communication related to notice of performance data.

From these, the present invention is effective in the technical field of optical submarine cable systems, particularly in the technical field of networks complying with the SDH and SONET standards.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transmission system comprising a plurality of nodes forming a network and a supervisory control device for managing said network on the basis of performance data created at these nodes, wherein
each of said plurality of nodes includes
performance data generating means for measuring individual data items about the monitoring items defined for a plurality of objects to be measured according to a specific schedule and, on the basis of the result of the measurement, creating said performance data using a zero suppression function of suppressing a succession of zero data items, and
performance data sending means for sending the performance data created at the performance data generating means to said supervisory control device, and
said supervisory control device includes reception means for receiving the performance data send from said nodes,
storage means for accumulating a history of the received performance data,
user interface means for accepting the user's data output request with specified retrieval conditions including a time range and outputting the data fulfilling the request, and
output control means which determines the cause that the performance data is absent, when the performance data that should be present in said storage means according to said schedule is absent in the time range specified in said retrieval conditions in acquiring the performance data fulfilling said retrieval conditions from said storage means, and if the cause is the execution of zero suppression at said performance data generating means, makes the data item related to the absent performance data zero, and which then creates data for output at said user interface means on the basis of said acquired performance data and causes said user interface means to output the created data.

2. The transmission system according to claim 1, wherein each of said nodes includes
sub-storage means for accumulating a history of the performance data created as said performance data generating means, and
said supervisory control device includes
performance data acquiring means for acquiring the performance data created at said nodes and storing the information in the storage means of its own device, and
lacked data acquiring means for, when there is a lack in the performance data stored in the storage means of its own device, acquiring the lacked performance data from the sub-storage means of said node and storing it in the storage means of its own device.

3. The transmission system according to claim 1 or 2, wherein said output control means includes time management means for updating and storing time Tc that said reception means received the performance data last,
period acquiring means for acquiring period T1 in which said data is measured at said performance data generating means,
first judging means for judging whether the time that performance data is to be created in said period T1 is present between Tc and T according to whether the expression $T-Tc>T1$ holds, provided that the time closest to the present time in the time range specified in said retrieval conditions is T,
number-of-omissions acquiring means for, if the first judging means has judged that the time that performance data is to be created is present, acquiring the number Ns of times the creation of performance data was omitted by said zero suppression function,
second judging means for judging whether the execution of zero suppression is present or absent according to whether the expression $Ns \cdot T1 > T-Tc \leq (Ns+1) \cdot T1$ holds, and
output data creating means for, if the second judging means has judged that the execution of zero suppression is present, making the data item related to said absent performance data zero and creating data for output at said user interface means on the basis of said read-out performance data and causing said user interface means to output the created data.

4. A transmission system comprising a plurality of nodes forming a network and a supervisory control device for managing said network on the basis of performance data created at these nodes, wherein
each of said plurality of nodes includes
performance data generating means for measuring individual data items about the monitoring items defined for a plurality of objects to be measured according to a specific schedule and, on the basis of the result of the measurement, creating said performance data using a zero suppression function of suppressing a succession of zero data items,
storage means for accumulating a history of the performance data created at the performance data generating means, and
retrieval means for searching said storage means according to retrieval conditions requested by said supervisory control device and acquiring the performance data fulfilling the retrieval conditions, and
performance data sending means for sending the performance data acquired by the retrieval means to said supervisory control device, and said supervisory control device includes
user interface means for accepting the user's data output request with specified retrieval conditions including a time range and outputting the data fulfilling the request,
performance data acquiring means for acquiring the performance data fulfilling said retrieval conditions from said nodes, and
output control means which determines the cause that the performance data is absent, when the performance data that should be present in said storage means according to said schedule is absent in the time range specified in said retrieval conditions in acquiring the performance data fulfilling said retrieval conditions from said nodes, and if the cause is the execution of zero suppression at said performance data generating means, makes the data item related to the absent performance data zero, and which then creates data for output at said user interface means on the basis of said acquired performance data and causes said user interface means to output the created data.

5. The transmission system according to claim 4, wherein said output control means includes
   time management means for updating and storing time Tc that said performance data acquiring means acquired performance data last,
   period acquiring means for acquiring period T1 in which said data is measured at said performance data generating means,
   first judging means for judging whether the time that performance data is to be created in said period T1 is present between Tc and T according to whether the expression $T-Tc>T1$ holds, provided that the time closest to the present time in the time range specified in said retrieval conditions is T,
   number-of-omissions acquiring means for, if the first judging means has judged that the time that performance data is to be created is present, acquiring the number Ns of times the creation of performance data was omitted by said zero suppression function,
   second judging means for judging whether the execution of zero suppression is present or absent according to whether the expression $Ns \cdot T1 < T - Tc \leq (Ns+1) \cdot T1$ holds, and
   output data creating means for, if the second judging means has judged that the execution of zero suppression is present, making the data item related to said absent performance data zero and creating data for output at said user interface means on the basis of said read-out performance data and causing said user interface means to output the created data.

6. A supervisory control device for managing a network composed of a plurality of nodes on the basis of the performance data created at each node, each of said plurality of nodes including performance data generating means for measuring individual data items about the monitoring items defined for a plurality of objects to be measured according to a specific schedule and, on the basis of the result of the measurement, creating said performance data using a zero suppression function of suppressing a succession of zero data items, said supervisory control device comprising:
   storage means for storing a history of said created performance data;
   user interface means for accepting the user's data output request with specified retrieval conditions for said performance data including at least a time range and outputting the performance data fulfilling the request, and
   output control means which determines the cause that the performance data is absent, when the performance data that should be present according to said schedule is absent in the time range specified in said retrieval conditions in acquiring the performance data fulfilling said performance data retrieval conditions from said storage means, and if the cause is the execution of zero suppression at said performance data generating means, makes the data item related to the absent performance data zero, and which then creates data for output at said user interface means on the basis of the acquired performance data and causes said user interface means to output the created data.

7. The supervisory control device according to claim 6, wherein each of said nodes includes
   sub-storage means for accumulating a history of the performance data created at said performance data generating means,
   performance data acquiring means for acquiring the performance data created at said nodes and storing it in the storage means of its own device, and
   lacked data acquiring means for, when there is a lack in the performance data stored in the storage means of its own device, acquiring the lacked performance data from the sub-storage means of said node and storing it in the storage means of its own device.

8. The supervisory control device according to claim 6 or 7, wherein said output control means includes
   time management means for updating and storing time Tc that said reception means received the performance data last,
   period acquiring means for acquiring period T1 in which said data is measured at said performance data generating means,
   first judging means for judging whether the time that performance data is to be created in said period T1 is present between Tc and T according to whether the expression $T-Tc>T1$ holds, provided that the time closest to the present time in the time range specified in said retrieval conditions is T,
   number-of-omissions acquiring means for, if the first judging means has judged that the time that performance data is to be created is present, acquiring the number Ns of times the creation of performance data was omitted by said zero suppression function,
   second judging means for judging whether the execution of zero suppression is present or absent according to whether the expression $Ns \cdot T1 < T - Tc \leq (Ns+1) \cdot T1$ holds, and
   output data creating means for, if the second judging means has judged that the execution of zero suppression is present, making the data item related to said absent performance data zero and creating data for output at said user interface means on the basis of said read-out performance data and causing said user interface means to output the created data.

9. A supervisory control device for managing a network composed of a plurality of nodes on the basis of the performance data created at each node, each of said plurality of nodes including
   performance data generating means for measuring individual data items about the monitoring items defined for a plurality of objects to be measured according to a specific schedule and, on the basis of the result of the measurement, creating said performance data using a zero suppression function of suppressing a succession of zero data items,
   storage means for storing a history of the performance data created at said performance data generating means,
   retrieval means for searching said storage means according to retrieval conditions requested by said supervisory control device and acquiring the performance data fulfilling the retrieval conditions, and
   performance data sending means for sending the performance data acquired by the retrieval means to said supervisory control device, said supervisory control device comprising:
   user interface means for accepting the user's data output request with specified retrieval conditions including a time range and outputting the performance data fulfilling the request, performance data acquiring means for acquiring the performance data fulfilling said retrieval conditions from said nodes, and output control means which determines the cause that the performance data is absent, when the performance data that should be present according to said schedule is absent in the time range specified in said retrieval conditions in acquiring the performance data fulfilling said retrieval conditions from said node, and if the cause is the execution of zero suppression at said performance data generating means, makes the data item related to the absent performance data zero, and which then creates data for output at said user interface means on the basis of said acquired performance data and causes said user interface means to output the created data.

10. The supervisory control device according to claim 9, wherein said output control means includes time management means for updating and storing time Tc that said performance data acquiring means acquired the performance data last, period acquiring means for acquiring period T1 in which said data is measured at said performance data generating means, first judging means for judging whether the time that performance data is to be created in said period T1 is present between Tc and T according to whether the expression $T-Tc>T1$ holds, provided that the time closest to the present time in the time range specified in said retrieval conditions is T, number-of-omissions acquiring means for, if the first judging means has judged that the time that performance data is to be created is present, acquiring the number Ns of times the creation of performance data was omitted by said zero suppression function, second judging means for judging whether the execution of zero suppression is present or absent according to whether the expression $Ns \cdot T1 < T-Tc \leq (Ns+1) \cdot T1$ holds, and output data creating means for, if the second judging means has judged that the execution of zero suppression is present, making the data item related to said absent performance data zero and creating data for output at said user interface means on the basis of said read-out performance data and causing said user interface means to output the created data.

11. A data outputting method in a supervisory control device which manages a network composed of a plurality of nodes for measuring individual data items about the monitoring items defined for a plurality of objects to be measured according to a specific schedule and, on the basis of the result of the measurement, creating said performance data using a zero suppression function of suppressing a succession of zero data items, and which includes storage means for accumulating a history of said created performance data, said data outputting method comprising:

a first step of, in response to the operation of requesting the output of data under specified retrieval conditions including at least a time range, judging the presence or absence of the possibility that indefiniteness will occur in the data outputted in said specified time range;

a second step of determining the cause, if it is judged at the first step that there is a possibility that said indefinite column will occur; and a third step of inserting 0s in the indefinite column and thereby restructuring the data to be supplied to an output process, if it is judged at the second step that the cause of the occurrence of said indefinite column is the execution of said zero suppression function.

12. The data output method according to claim 11, wherein said first step acquires time Tc that performance data was created last and period T1 in which quality data is totalized at said node, and judges the presence or absence of the possibility that said indefinite column will occur according to whether the expression $T-Tc>T1$ holds, provided that the time closest to the present time in the time range specified in said retrieval conditions is T, and said second step acquires the number Ns of times the creation of performance data was omitted by said zero suppression function at said node and determines the cause of the occurrence of said indefinite column by checking whether the expression $Ns \cdot T1 < T-Tc \leq (Ns+1) T1$ holds.

13. The data output method according to claim 12, further comprising a fourth step of, if $T-Tc>(Ns+1) \cdot T1$ holds at said second step, regarding the performance data to be stored in said storage means as having a lack in it and restoring the performance data.

* * * * *